US011283635B2

(12) United States Patent
Smith et al.

(10) Patent No.: US 11,283,635 B2
(45) Date of Patent: Mar. 22, 2022

(54) DYNAMIC SHARING IN SECURE MEMORY ENVIRONMENTS USING EDGE SERVICE SIDECARS

(71) Applicant: Intel Corporation, Santa Clara, CA (US)

(72) Inventors: Ned M. Smith, Beaverton, OR (US); Kshitij Arun Doshi, Tempe, AZ (US); Francesc Guim Bernat, Barcelona (ES); Mona Vij, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 16/723,029

(22) Filed: Dec. 20, 2019

(65) Prior Publication Data

US 2020/0127980 A1    Apr. 23, 2020

Related U.S. Application Data

(60) Provisional application No. 62/939,303, filed on Nov. 22, 2019, provisional application No. 62/907,597, filed on Sep. 28, 2019.

(51) Int. Cl.
*H04L 9/32* (2006.01)
*H04L 9/08* (2006.01)
(Continued)

(52) U.S. Cl.
CPC .......... *H04L 9/3297* (2013.01); *G06F 8/443* (2013.01); *G06F 9/3836* (2013.01);
(Continued)

(58) Field of Classification Search
None
See application file for complete search history.

(56) References Cited

U.S. PATENT DOCUMENTS 8,364,959 B2 * 1/2013 Bhanoo ............... G06Q 20/356
                                                                713/168
9,779,269 B1 * 10/2017 Perlman ............... H04L 9/0822
(Continued)

FOREIGN PATENT DOCUMENTS

WO    2020226979    11/2020

OTHER PUBLICATIONS

CN208424434. English Translation. (Year: 2019).*
(Continued)

*Primary Examiner* — Venkat Perungavoor
(74) *Attorney, Agent, or Firm* — Schwegman Lundberg & Woessner, P.A.

(57) ABSTRACT

Various approaches for memory encryption management within an edge computing system are described. In an edge computing system deployment, a computing device includes capabilities to store and manage encrypted data in memory, through processing circuitry configured to: allocate memory encryption keys according to a data isolation policy for a microservice domain, with respective keys used for encryption of respective sets of data within the memory (e.g., among different tenants or tenant groups); and, share data associated with a first microservice to a second microservice of the domain. Such sharing may be based on the communication of an encryption key, used to encrypt the data in memory, from a proxy (such as a sidecar) associated with the first microservice to a proxy associated with the second microservice; and maintaining the encrypted data within the memory, for use with the second microservice, as accessible with the communicated encryption key.

25 Claims, 13 Drawing Sheets

(51) Int. Cl.

| | | |
|---|---|---|
| *G06F 21/78* | (2013.01) | |
| *H04L 29/06* | (2006.01) | |
| *G06F 12/14* | (2006.01) | |
| *G06F 9/455* | (2018.01) | |
| *G06F 16/18* | (2019.01) | |
| *G06F 16/23* | (2019.01) | |
| *G06F 11/10* | (2006.01) | |
| *H04L 9/06* | (2006.01) | |
| *H04L 41/0893* | (2022.01) | |
| *H04L 41/5009* | (2022.01) | |
| *H04L 41/5025* | (2022.01) | |
| *H04L 43/08* | (2022.01) | |
| *H04L 67/1008* | (2022.01) | |
| *G06F 9/54* | (2006.01) | |
| *G06F 21/60* | (2013.01) | |
| *H04L 9/00* | (2022.01) | |
| *H04L 41/0896* | (2022.01) | |
| *H04L 41/142* | (2022.01) | |
| *H04L 41/5051* | (2022.01) | |
| *H04L 67/141* | (2022.01) | |
| *H04L 41/14* | (2022.01) | |
| *H04L 47/70* | (2022.01) | |
| *H04L 67/12* | (2022.01) | |
| *G06F 8/41* | (2018.01) | |
| *G06F 9/38* | (2018.01) | |
| *G06F 9/445* | (2018.01) | |
| *G06F 9/48* | (2006.01) | |
| *G06F 9/50* | (2006.01) | |
| *G06F 11/34* | (2006.01) | |
| *G06F 21/62* | (2013.01) | |
| *H04L 67/10* | (2022.01) | |
| *G16Y 40/10* | (2020.01) | |

(52) U.S. Cl.
CPC ...... *G06F 9/44594* (2013.01); *G06F 9/45533* (2013.01); *G06F 9/4881* (2013.01); *G06F 9/505* (2013.01); *G06F 9/544* (2013.01); *G06F 11/1004* (2013.01); *G06F 11/3433* (2013.01); *G06F 12/1408* (2013.01); *G06F 16/1865* (2019.01); *G06F 16/2322* (2019.01); *G06F 21/602* (2013.01); *H04L 9/008* (2013.01); *H04L 9/0637* (2013.01); *H04L 9/0822* (2013.01); *H04L 9/0825* (2013.01); *H04L 9/0866* (2013.01); *H04L 41/0893* (2013.01); *H04L 41/0896* (2013.01); *H04L 41/142* (2013.01); *H04L 41/145* (2013.01); *H04L 41/5009* (2013.01); *H04L 41/5025* (2013.01); *H04L 41/5051* (2013.01); *H04L 43/08* (2013.01); *H04L 47/822* (2013.01); *H04L 63/0407* (2013.01); *H04L 63/0428* (2013.01); *H04L 63/1408* (2013.01); *H04L 63/20* (2013.01); *H04L 67/1008* (2013.01); *H04L 67/12* (2013.01); *H04L 67/141* (2013.01); *G06F 2209/509* (2013.01); *G16Y 40/10* (2020.01); *H04L 67/10* (2013.01); *H04L 2209/127* (2013.01)

(56) References Cited

U.S. PATENT DOCUMENTS

| | | | |
|---|---|---|---|
| 9,887,876 | B2 * | 2/2018 | Kumar ................ H04L 67/1097 |
| 10,623,390 | B1 * | 4/2020 | Rosenhouse ........ H04L 61/2525 |
| 11,074,091 | B1 * | 7/2021 | Nayakbomman ......... G06F 8/65 |
| 2011/0296019 | A1 | 12/2011 | Ferris et al. |
| 2012/0303818 | A1 | 11/2012 | Thibeault et al. |
| 2018/0285009 | A1 | 10/2018 | Guim Bernat et al. |
| 2019/0102577 | A1 | 4/2019 | Gueron et al. |
| 2019/0155728 | A1 | 5/2019 | Ferguson et al. |
| 2019/0253244 | A1 | 8/2019 | Hamel et al. |

OTHER PUBLICATIONS

Emerging Trends, Techniques and Open Issues of Containerization: A Review. Watada. IEEE. (Year: 2019).*
Edge computing for Internet of Things: A survey, e-healthcare case study and future direction. Ray. Elsevier. (Year: 2019).*
"U.S. Appl. No. 17/119,785, Preliminary Amendment filed", 7 pgs.
"International Application Serial No. PCT US2020 030554, International Search Report dated Jan. 15, 2021", 5 pgs.
"International Application Serial No. PCT US2020 030554, Written Opinion dated Jan. 15, 2021", 6 pgs.
Guangshun, Li, "Method of Resource Estimation Based on QoS in Edge Computing, Published in: Hindawi Wireless Communications and Mobile Computing", (Jan. 22, 2018).
Hesham, El-Sayed, "Edge of Things: The Big Picture on the Integration of Edge, IoT and the Cloud in a Distributed Computing Environment", (Feb. 14, 2018).
Hardjono, Thomas, "Decemtralized Trusted Computing Base for Blockchain Infrastructure Security", Frontiers in Blockchain, (Dec. 6, 2019), 15 pgs.
Latzo, Tobias, "A universal taxonomy and survey of forensic memory acquisition techniques", Digital Investigation 28, (2019), 56-69.

* cited by examiner

DYNAMIC SHARING IN SECURE MEMORY ENVIRONMENTS USING EDGE SERVICE SIDECARS

PRIORITY APPLICATIONS

This application claims the benefit of priority to U.S. Provisional Application Ser. No. 62/907,597, filed Sep. 28, 2019 and to U.S. Provisional Application Ser. No. 62/939,303, filed Nov. 22, 2019, all of which are incorporated herein by reference in their entirety.

TECHNICAL FIELD

Embodiments described herein generally relate to data processing, network communication, and communication system implementations, and in particular, to techniques for conducting secure management and sharing of data among respective instances of edge computing platforms in connected edge computing networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved. This complexity (and the need for security) is increased in settings where services are offered in an "Edge as a Service" (EaaS) configuration, where scalable edge computing resources are offered and managed in a way that presents the resources to users as a coordinated "service" available to perform workloads, rather than as resources located among a set of distributed and separated nodes.

The deployment of various Edge, EaaS, MEC, Fog, and IoT networks, devices, and services have introduced a number of advanced use cases and distributed computing scenarios occurring at and towards the edge of the network. However, these advanced use cases have also introduced a number of corresponding technical challenges relating to security, processing and network resources, service availability and efficiency, among many other issues. One such challenge is in relation to security and trust, and end-to-end security protection challenges and security key management introduced with microservices (also known as "uServices" or "µ services") and associated service sidecars and data. As microservices are increasingly implemented within edge computing systems and deployments, the need for securing data within such microservices—and the need to securely share data among authorized entities and resources—will continue to expand.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
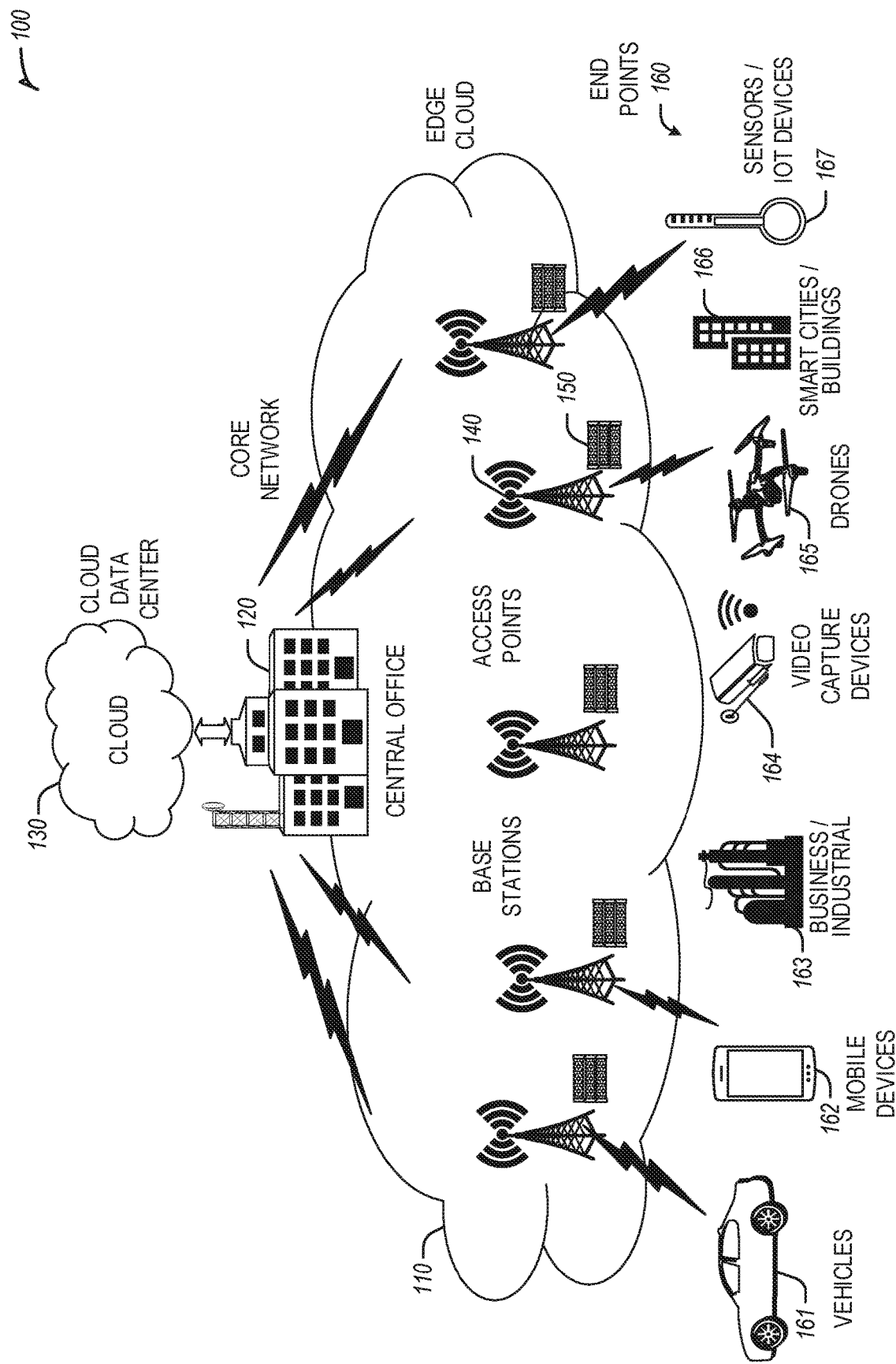
FIG. 1 illustrates an overview of an edge cloud configuration for edge computing, according to an example.

In the following description, methods, configurations, and related apparatuses are disclosed for management of secure memory operations in a multi-tenant, multi-system environment in an edge computing environment. In an example, an edge-as-a-service (EaaS) platform operating various microservice instances (such as an instance provided within a virtual machine (VM)) that are paired with respective sidecar instances (such as an instance provided within another VM), each of which is managed by a supervising entity (such as by a hypervisor), may be coordinated with a memory encryption scheme that provides a tenant-specific pairing. With this configuration, multiple pairs of microservice/sidecar instances can be arranged to support secure multi-tenancy management of data on the same edge computing platform, via shared and managed encryption keys. This configuration enables performance optimizations and secure sharing of data even as end-to-end data encryption protections are applied among system memory, paging, direct memory access (DMA), and memory sharing arrangements. This configuration further may be applicable to edge computing entities within single computing system, device, or node (e.g., operating on a common computing hardware platform), a mesh configuration (involving multiple nodes, devices, or platforms), or other permutations of communicating and cooperating edge computing devices and implementations.

Edge computing and edge-as-a-service (EaaS) distributed computing architectures encounter several encryption key management and end-to-end data protection challenges, when using EaaS building blocks such as microservices, sidecars, and secure memory encryption (e.g., Intel® Total Memory Encryption (TME) or Intel® Multi-Key Total Memory Encryption (MKTME)) implementations. For instance, MKTME operates to encrypt data stored in memory, with the use of multiple keys; each particular thread then refers to the encrypted data in memory, and the memory controller performs decryption of the particular key on a cache line by cache line basis.

The use of MKTME and other secure memory encryption techniques introduces technical challenges for configuring memory encryption key tables with keys that correspond to the appropriate EaaS service mesh peer context. These challenges may prevent efficient and secure peer-to-peer interactions from occurring-especially as data is attempted to be shared within a computing system that has access to the same memory. Additionally, security challenges exist in edge computing settings for secure interactions, as system operators may want to ensure that there is end-to-end protection established for the memory resources utilized by main CPU and DMA peripherals. These and other challenges and security considerations are addressed by the following uses of memory encryption, microservice and sidecar implementations, and the use of a specially configured service mesh or other proxy accessible by microservice sidecars.

Although many forms of encryption and security are planned to be used in distributed edge computing settings, existing encryption and security configurations have not provided a robust mechanism for ensuring security in multi-tenant settings. For instance, MKTME is a widely deployed technology that encrypts main memory on a computing system using configurable encryption keys, but a full-scale deployment of MKTME in a computing system having multiple tenants results in multiple forms of data isolation. Other prior approaches, such as TME, accomplished memory encryption using a single system key that encrypts and treats all data (for any tenant) as equivalent, but did not ensure security among different tenants. Neither approach addresses multi-tenancy security and usage/sharing requirements that is required for a flexible EaaS microservice deployment. As a result, these and other prior data encryption approaches have not provided key management functions that may enable edge computing peers and EaaS components to securely interact while readily sharing data in a safe, managed environment.

In an example discussed in detail below, a sidecar implements secure key exchange and key management practices interactions among microservices, using a configuration provided by a service mesh or other type of proxy. The sidecar may also manage end-to-end data protections using memory encryption techniques (such as MKTME) to ensure that data remains protected while in system memory. The service mesh also may coordinate the sharing of encryption keys from a higher-level domain (established between multiple sidecar VMs, among a sidecar and a hypervisor).

The following examples also provide specific use cases of secured, shared data exchanges among tenants, enabled through the configuration provided by this service mesh or proxy, such as when one tenant provides secure data to another tenant as data is transferred from one microservice instance to another within a same computer system. These secured data exchanges are designed to implement performance improvements for a variety of inter-process communication (IPC) interactions and DMA accesses involving protected data. Additionally, the following examples enable use cases for private interactions between microservice VMs and sidecar VMs which utilize an MKTME key to protect shared memory segments exclusive to the VM pairing. Other combinations of interactions among services, sidecars, VMs, hypervisors, and domains, devices, and systems employing these components are also enabled.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the secure memory management techniques and the compute and network configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may be enhanced with the use of microservices and secure data management and sharing, as discussed in more detail below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
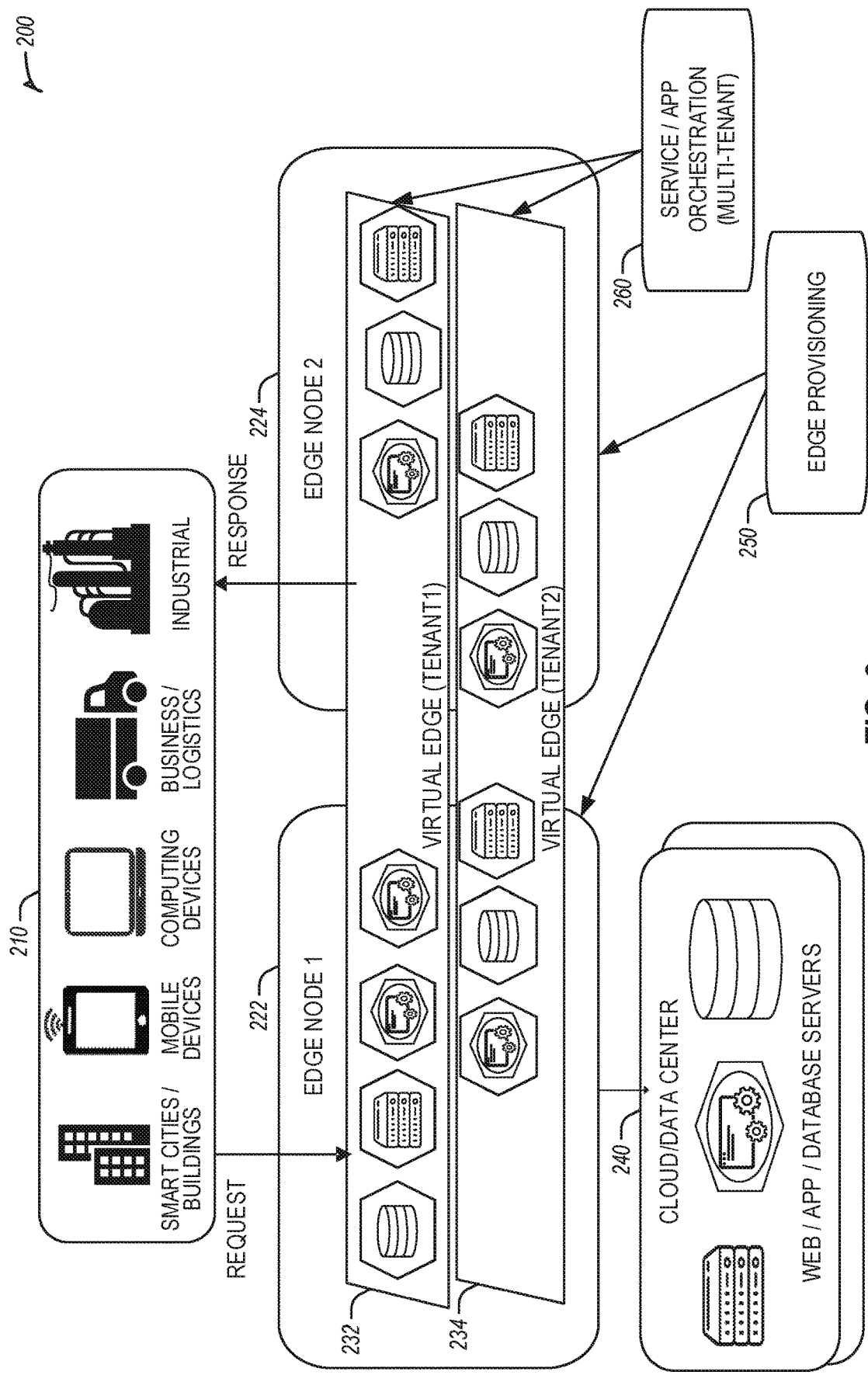
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice. A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc. Use of this RoT and the security architecture may be enhanced by the sidecar secure memory management operations further discussed below.

Edge computing nodes may partition resources (memory, CPU, GPU, interrupt controller, I/O controller, memory controller, bus controller, etc.) where each partition may contain a RoT capability and where fan-out and layering according to a DICE model may further be applied to edge nodes. Cloud computing nodes consisting of containers, FaaS (function as a service) or EaaS engines, servlets, servers, or other computation abstraction may be partitioned according to a DICE layering and fan-out structure to support a RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a RoT context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
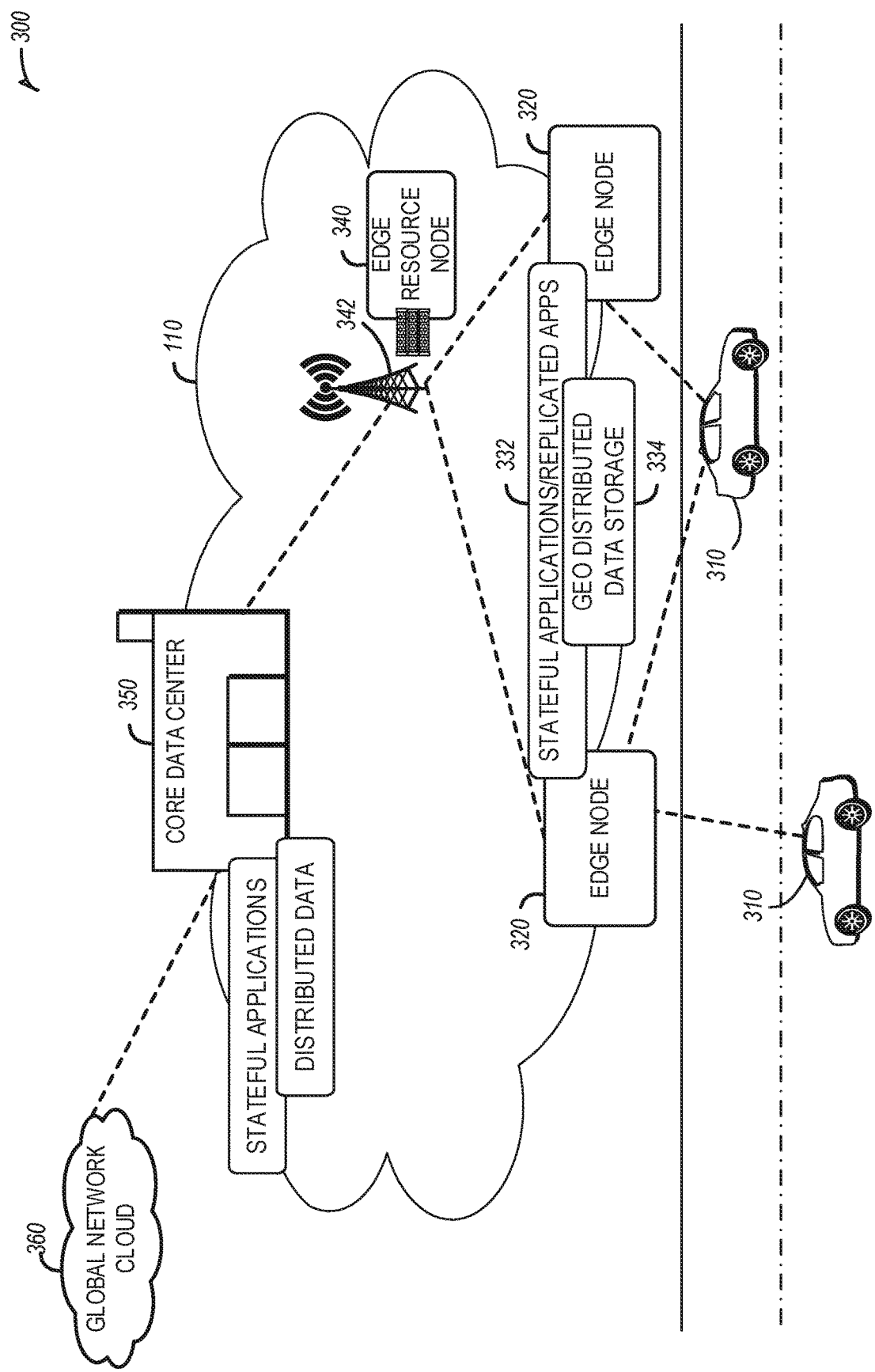
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310.

Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS and EaaS computing capabilities through the use of respective executable applications and functions. In an example, a developer writes function code (e.g., "computer code" herein) representing one or more computer functions, and the function code is uploaded to a FaaS/EaaS platform provided by, for example, an edge node or data center. A trigger such as, for example, a service use case or an edge processing event, initiates the execution of the function code with the FaaS/EaaS platform.

In an example FaaS or EaaS deployment, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS and EaaS may enable deployment of edge functions in a service fashion, including a support of respective functions that support edge computing as a service. Additional features of FaaS and EaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example MEC Implementations

In further examples, FaaS and EaaS implementations may be implemented by a "MEC" system arranged according to the standards and approaches published in ETSI GS MEC-003 "Mobile Edge Computing (MEC); Framework and Reference Architecture" (e.g., V2.0.3) and related MEC or networked operational implementations. While the present secure memory management and sharing and configurations may provide significant benefits to multi-user MEC architectures, the applicability of the present techniques and configurations may be extended to any number of edge computing, IoT, fog, or distributed computing platforms.

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

MEC, like other edge computing deployments, may reduce network congestion by operating applications, data functions, and discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offers application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

Figure 4:
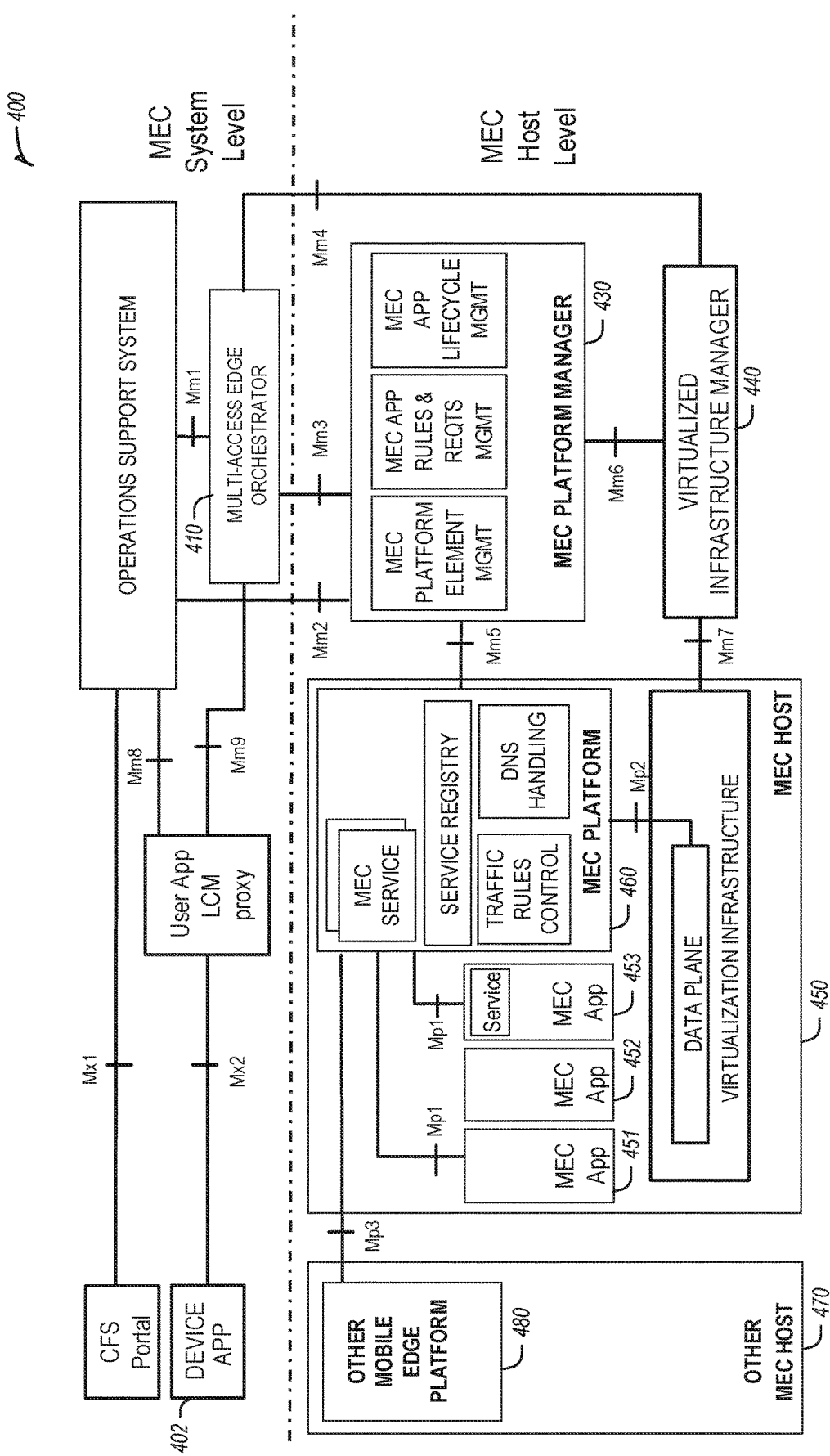
FIG. 4 illustrates a block diagram for a Multi-access Edge Computing (MEC) system architecture, according to an example.

FIG. 4 depicts a block diagram 400 for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx refers to connections to external entities. The services, applications, orchestrators, and other entities discussed herein may be implemented at any number of the entities of the MEC system architecture depicted in FIG. 4, and the communications to perform network operations may be implemented at any number of the interfaces of the MEC system architecture depicted in FIG. 4.

Figure 7:
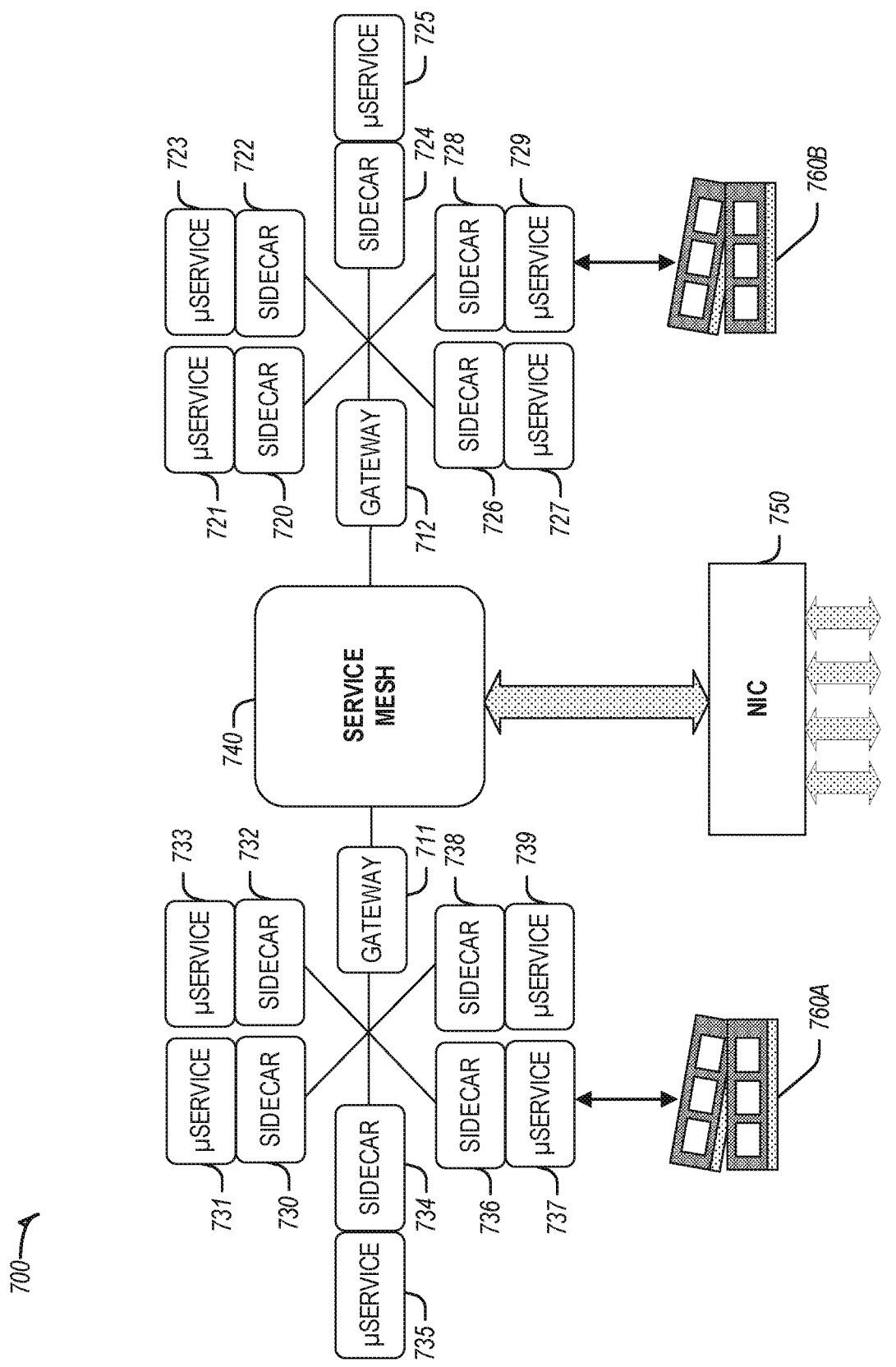
FIG. 7 illustrates a block diagram depicting an edge service mesh deployment using sidecars for interactions among microservices, according to an example.

For instance, a device application 402 operating at a client user equipment device (e.g., smartphone) may access a multi-access edge orchestrator 410, to access a microservice via a service mesh as further detailed in FIG. 7. A MEC Host 450 may operate one or more MEC applications 451, 452, 453 or a platform 460 which access a service on behalf of multiple MEC tenants, as further detailed in FIGS. 10 and 11. A virtualized infrastructure manager 440 and MEC Platform Manager 430 provide management of the use of the hosts, platforms, and resources, and may also provide managed access to an attestation service or verifier (not shown). The virtualized infrastructure manager 440 and MEC Platform Manager 430 may also provide managed access to other MEC hosts (e.g., host 470) or MEC platforms (e.g., platform 480), which may also be involved with uses of attestation functionality as described herein.

Example Computing Device Implementations

Figure 5:
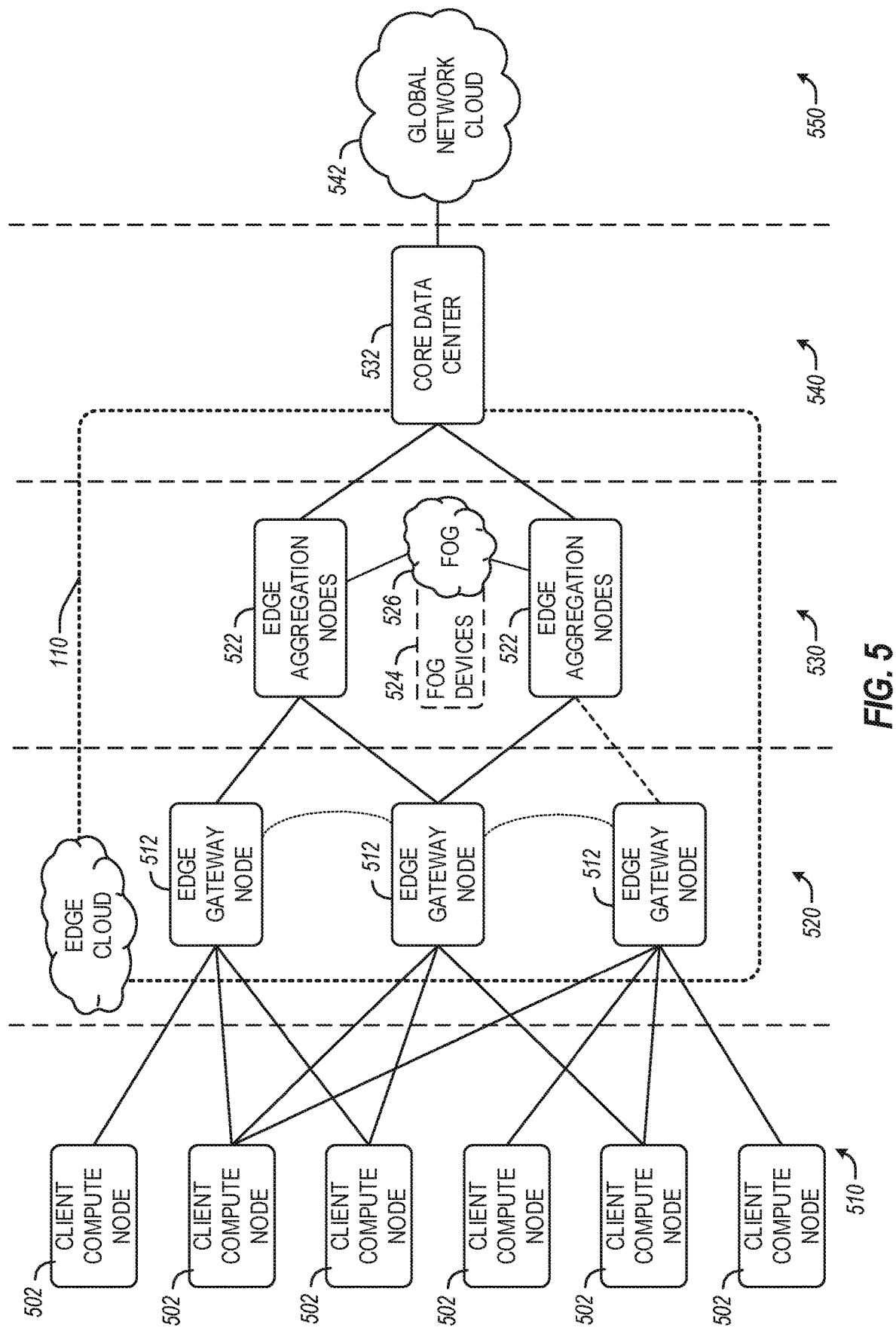
FIG. 5 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 5 provides a further abstracted overview of layers of distributed compute deployed among an edge computing environment for purposes of illustration.

FIG. 5 generically depicts an edge computing system for providing edge services and applications to multi-stakeholder entities, as distributed among one or more client compute nodes 502, one or more edge gateway nodes 512, one or more edge aggregation nodes 522, one or more core data centers 532, and a global network cloud 542, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities. Various forms of wired or wireless connections may be configured to establish connectivity among the nodes 502, 512, 522, 532, including interconnections among such nodes (e.g., connections among edge gateway nodes 512, and connections among edge aggregation nodes 522).

Each node or device of the edge computing system is located at a particular layer corresponding to layers 510, 520, 530, 540, 550. For example, the client compute nodes 502 are each located at an endpoint layer 510, while each of the edge gateway nodes 512 are located at an edge devices layer 520 (local level) of the edge computing system. Additionally, each of the edge aggregation nodes 522 (and/or fog devices 524, if arranged or operated with or among a fog networking configuration 526) are located at a network access layer 530 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 532 is located at a core network layer 540 (e.g., a regional or geographically-central level), while the global network cloud 542 is located at a cloud data center layer 550 (e.g., a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 532 may be located within, at, or near the edge cloud 110.

Although an illustrative number of client compute nodes 502, edge gateway nodes 512, edge aggregation nodes 522, core data centers 532, global network clouds 542 are shown in FIG. 5, it should be appreciated that the edge computing system may include more or fewer devices or systems at each layer. Additionally, as shown in FIG. 5, the number of components of each layer 510, 520, 530, 540, 550 generally increases at each lower level (i.e., when moving closer to endpoints). As such, one edge gateway node 512 may service multiple client compute nodes 502, and one edge aggregation node 522 may service multiple edge gateway nodes 512.

Consistent with the examples provided herein, each client compute node 502 may be embodied as any type of end point component, device, appliance, or "thing" capable of communicating as a producer or consumer of data. Further, the label "node" or "device" as used in the edge computing system 500 does not necessarily mean that such node or device operates in a client or slave role; rather, any of the nodes or devices in the edge computing system 500 refer to individual entities, nodes, or subsystems which include discrete or connected hardware or software configurations to facilitate or use the edge cloud 110.

As such, the edge cloud 110 is formed from network components and functional features operated by and within the edge gateway nodes 512 and the edge aggregation nodes 522 of layers 520, 530, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 5 as the client compute nodes 502. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 526 (e.g., a network of fog devices 524, not shown in detail), which may be embodied as a system-level horizontal and distributed architecture that distributes resources and services to perform a specific function. For instance, a coordinated and distributed network of fog devices 524 may perform computing, storage, control, or networking aspects in the context of an IoT system arrangement. Other networked, aggregated, and distributed functions may exist in the edge cloud 110 between the cloud data center layer 550 and the client endpoints (e.g., client compute nodes 502). Some of these are discussed in the following sections in the context of network functions or service virtualization, including the use of virtual edges and virtual services which are orchestrated for multiple stakeholders.

The edge gateway nodes 512 and the edge aggregation nodes 522 cooperate to provide various edge services and security to the client compute nodes 502. Furthermore, because each client compute node 502 may be stationary or mobile, each edge gateway node 512 may cooperate with other edge gateway devices to propagate presently provided edge services and security as the corresponding client compute node 502 moves about a region. To do so, each of the edge gateway nodes 512 and/or edge aggregation nodes 522 may support multiple tenancy and multiple stakeholder configurations, in which services from (or hosted for) multiple service providers and multiple consumers may be supported and coordinated across a single or multiple compute devices.

In various examples, the present memory security techniques may be implemented at a single instance of a client compute node 502 (e.g., among a set of microservice instance at the node, as the node hosts multiple tenant within memory resources of the node), at the edge gateway nodes 512 or aggregation nodes 522 (e.g., hosting a similar service and tenant arrangement), at other intermediate nodes in the edge cloud 110 (e.g., which operate orchestrator functions, attestation service functions, etc.), or among other combinations or groups of these nodes, as further discussed below with reference to the encryption techniques and services detailed in FIGS. 7 to 13.

In further examples, any of the compute nodes or devices discussed with reference to the present edge computing systems and environment may be fulfilled based on the components depicted in FIGS. 6A and 6B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 6A:
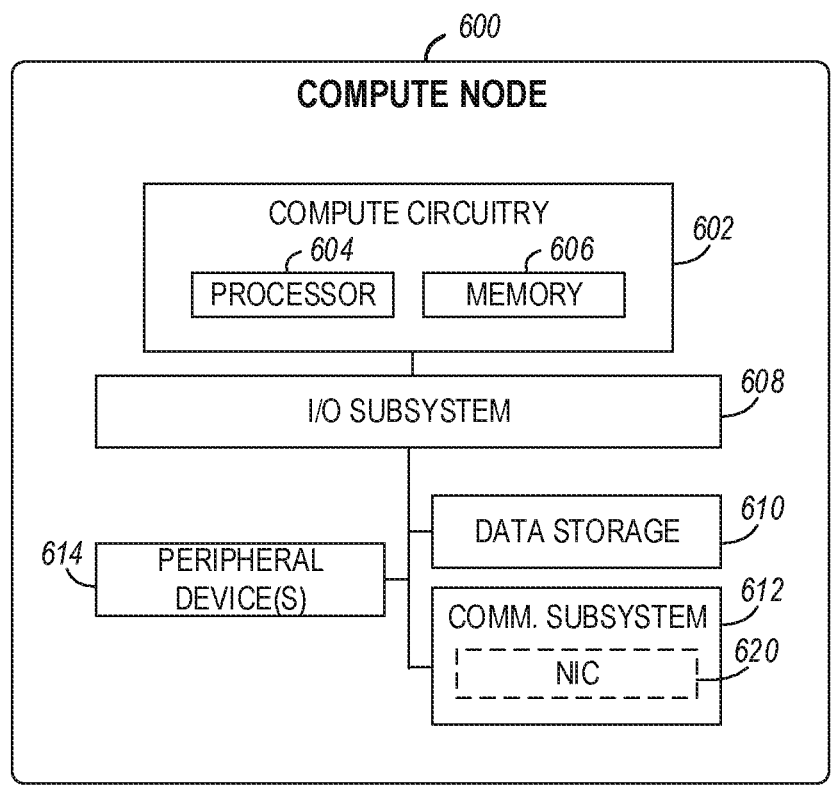
FIG. 6A illustrates an overview of example components deployed at a compute node system, according to an example.

In the simplified example depicted in FIG. 6A, an edge compute node 600 includes a compute engine (also referred to herein as "compute circuitry") 602, an input/output (I/O) subsystem 608, data storage 610, a communication circuitry subsystem 612, and, optionally, one or more peripheral devices 614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing an application). For example, the processor 604 may be embodied as a multi-core processor(s), a microcontroller, or other processor or processing/controlling circuit. In some examples, the processor 604 may be embodied as, include, or be coupled to an FPGA, an application specific integrated circuit (ASIC), reconfigurable hardware or hardware circuitry, or other specialized hardware to facilitate performance of the functions described herein.

The main memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 606 may be integrated into the processor 604. The main memory 606 may store various software and data used during operation such as one or more applications, data operated on by the application(s), libraries, and drivers.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the main memory 606, and other components of the compute circuitry 602, into the compute circuitry 602.

The one or more illustrative data storage devices 610 may be embodied as any type of devices configured for short-term or long-term storage of data such as, for example, memory devices and circuits, memory cards, hard disk drives, solid-state drives, or other data storage devices. Each data storage device 610 may include a system partition that stores data and firmware code for the data storage device 610. Each data storage device 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway node 512 of the edge computing system 500). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node 512). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally or alternatively, in such examples, the local memory of the NIC 620 may be integrated into one or more components of the client compute node at the board level, socket level, chip level, and/or other levels.

Additionally, in some examples, each compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node in an edge computing system (e.g., client compute node 502, edge gateway node 512, edge aggregation node 522) or like forms of appliances, computers, subsystems, circuitry, or other components.

Figure 6B:
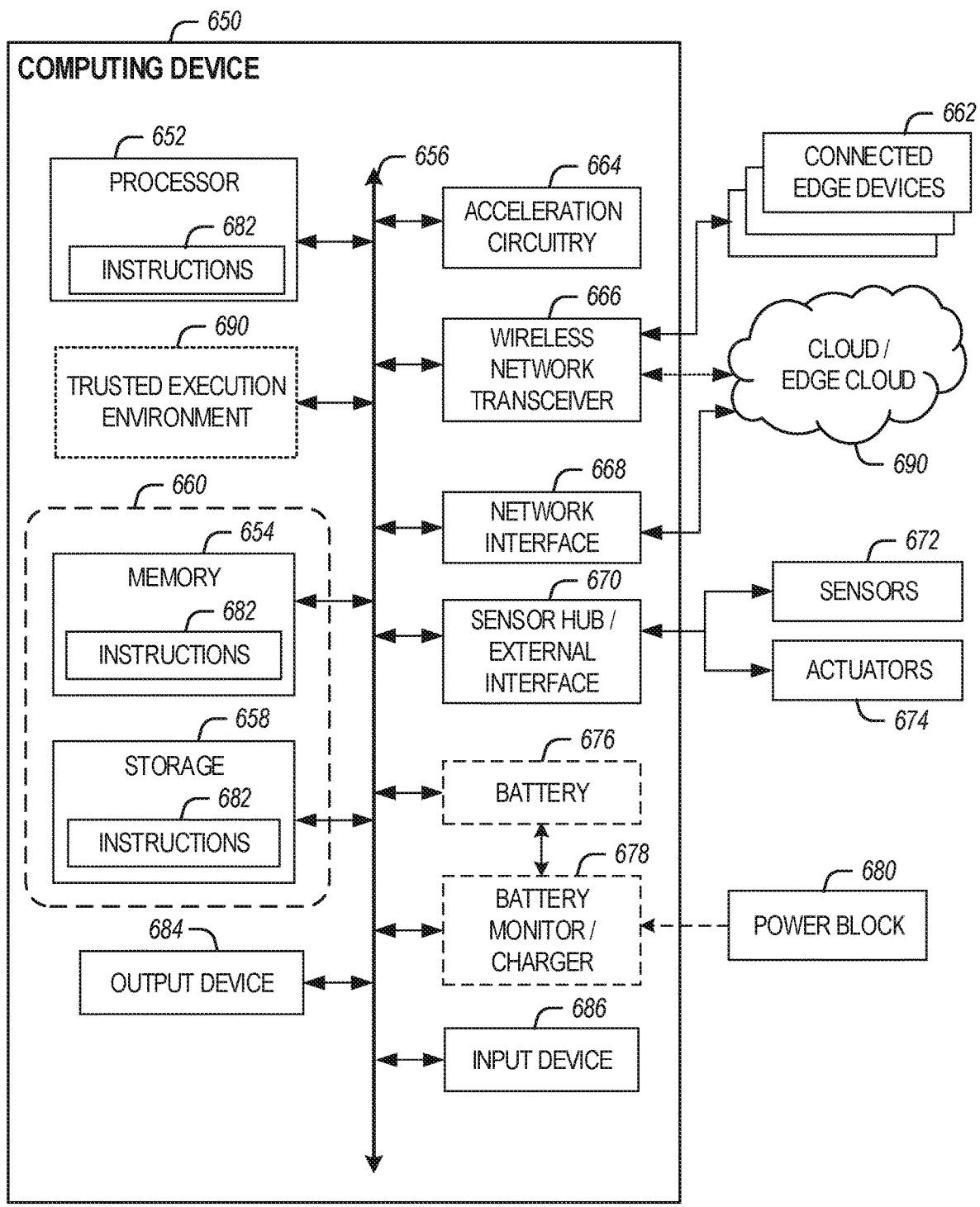
FIG. 6B illustrates a further overview of example components within a computing device, according to an example.

In a more detailed example, FIG. 6B illustrates a block diagram of an example of components that may be present in an edge computing node 650 for implementing the techniques (e.g., operations, processes, methods, and methodologies) described herein. The edge computing node 650 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 650, or as components otherwise incorporated within a chassis of a larger system. Further, to support the security examples provided herein, a hardware RoT (e.g., provided according to a DICE architecture) may be implemented in each IP block of the edge computing node 650 such that any IP Block could boot into a mode where a RoT identity could be generated that may attest its identity and its current booted firmware to another IP Block or to an external entity.

The edge computing node 650 may include processing circuitry in the form of a processor 652, which may be a microprocessor, a multi-core processor, a multithreaded processor, an ultra-low voltage processor, an embedded processor, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, Calif. As an example, the processor 652 may include an Intel® Architecture Core™ based processor, such as a Quark™, an Atom™, a Xeon™, an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 652 may communicate with a system memory 654 over an interconnect 656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an I2C interface, an SPI interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on BLE, or another low power radio, to save power. More distant connected edge devices 662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 666 (e.g., a radio transceiver) may be included to communicate with devices or services in the edge cloud 690 via local or wide area network protocols. The wireless network transceiver 666 may be an LPWA transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 690 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, a global positioning system (GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 650.

A battery 676 may power the edge computing node 650, although, in examples in which the edge computing node 650 is mounted in a fixed location, it may have a power supply coupled to an electrical grid. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, Calif., among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as optical disks, flash drives, or any number of other hardware devices. The non-transitory, machine-readable medium 660 may include instructions to direct the processor 652 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 6A and 6B are intended to depict a high-level view of components of a device, subsystem, or arrangement of an edge computing node. However, it will be understood that some of the components shown may be omitted, additional components may be present, and a different arrangement of the components shown may occur in other implementations.

Secure Memory Sharing Examples

The following examples utilize hardware extensions and system configurations to employ dynamic memory encryption key generation and sharing among microservice sidecars (e.g., supporting processes or services that are deployed along with the primary microservice application). With the following configurations, hardware-encrypted memory may be shared seamlessly and efficiently among operational domains (including among domains encompassing different microservices for the same or different tenants). Sidecars implement much of the key management framework for EaaS mesh and edge interactions so that producer-consumer streaming among chains of microservices automatically occurs, while avoiding hardware latencies that arise from in-place trans-encryption.

FIG. 7 illustrates a block diagram depicting an example edge service mesh deployment 700 using sidecars for coordinating interactions among microservices. In the depicted deployment, a variety of microservices 721, 723, 725, 727, 729 in a first cluster (e.g., connected to a service mesh 740 via gateway 712) and microservices 731, 733, 735, 737, 739 in a second cluster (e.g., connected to the service mesh 740 via gateway 711) are connected to each other via respective sidecars (720, 722, 724, 726, 728, 730, 732, 734, 736, 738). The respective sidecars and microservices may be implemented via respective VMs which are launched and managed by one or more hypervisors (not shown) of the computing system(s) or node(s), in some examples with the use of containers.

Within the deployment 700, various "proxies" for operations are, or can be, untrusted intermediaries that may be expected to perform routing and conveyance functions. In such a scenario, compromise of a proxy may result in denial of service but not more serious security issues. However, in this scenario, a sidecar may request attestation from a gateway or proxy to assess the trustworthiness of that environment to better infer the risk of denial of service. An edge orchestrator may also perform this duty.

Among other functions, each sidecar provides a mechanism for managing secure access to encrypted memory associated with its paired microservice (e.g., memory 760A associated with microservice 737, and memory 760B associated with microservice 729, etc.). Further, the sidecars 730, 732, 734, 736, 738 of the first cluster provide a mechanism for managing secure access to encrypted memory associated with the first cluster, while sidecars 720, 722, 724, 726, 728 provide a mechanism for managing secure access to encrypted memory associated with the second cluster.

Both a microservice and sidecar may have a HW RoT (e.g., implemented with a DICE specification architecture) that may attest its identity and firmware configuration. It may be expected that a microservice will attest to a sidecar and a sidecar may relay the microservice attestation to a gateway or peer gateway or peer sidecar or peer microservice. A sidecar may attest its own identity and firmware config similarly. As discussed below, a tenant specific key may be derived or generated using a secret value that is derived from a microservice (or sidecar identity or firmware configuration) such that it may be used to protect tenant data or authenticate a tenant.

Connectivity among the clusters may be managed or coordinated with use of the service mesh 740. The sidecars and microservices may be deployed among one or multiple computing systems or clusters of systems, but are shown in the example of FIG. 7 as being operated on a common computing system. Thus, the service mesh 740 provides a connection to a particular network interface card (NIC) 750 or network card array of the computing system, to provide network access with other (external) devices, systems, users, consumers, nodes, etc.

A valuable feature of a sidecar is that it offers a loadable security model or other security policy enforcement point, with an environment that has a "trusted path" relationship with its paired container environment. The sidecar may also share data and state. Sidecars may not be "trusted" or "trustable" to the same extent that a secure enclave is recognized as a trusted execution environment; however, it is assumed that sidecars are at least as trusted as its paired container (e.g., the container running the corresponding microservice). Further, sidecars are useful to broker interactions with external entities because sidecars offer a sandbox environment where different staging and filtering can be applied. This provides functionality similar to an application firewall that is specific to its paired container.

Accordingly, sidecars can provide trusted execution environments for supporting security functions such as cryptographic key generation, storage and usage, and other features. Sidecars can also enable security sensitive computations that protect privacy, intellectual property, content or other information assets from less-hardened mesh nodes. Furthermore, sidecars with trusted computing capabilities can attest the microservice configuration to peer microservice and sidecar nodes. A nesting of microservice/sidecar mesh nodes can attest the nesting structure or mesh structure such that a configuration of microservice and sidecar nodes can be evaluated for correct/incorrect structure, connectivity, and topology.

The service mesh 740 in the arrangement of FIG. 7 may also be used as part of a network (cascade) of functions. For example, a complex program could include a top level 'inner loop' that is further composed of several inner-inner loops which may further be composed of inner-inner-inner loops etc. Each nesting of an inner loop may be supported by an accelerator offload (e.g., to acceleration hardware). Thus, many complex or coordinated scenarios may be enabled through the use of a service mesh within an edge computing arrangement. Additionally, the sidecar configurations discussed herein may enable bridging between different memory DIMMS hosted in the edge node that are utilized among different processing devices (e.g., FPGA, accelerators, etc.).

Within the configuration of FIG. 7 and like implementations, the various microservice VMs (e.g., respective VMs that implement microservices 720, 722, 724, 726, 728, 730, 732, 734, 736, 738) and sidecar VMs (e.g., respective VMs that implement sidecars 721, 723, 725, 727, 729, 731, 733, 735, 737, 739) may rely on a hypervisor for provisioning a VM-specific or tenant-specific seed that is used to derive tenant keys for secure memory operations, as discussed in more detail below. In an example, the hypervisor may partition resources according to a tenant assignment (e.g., blocks for device A are partitioned into blocks 0-N and allocated to Tenant 1; blocks N+1-M are allocated to Tenant 2, etc.). The tenant-specific keys used to protect data may be persisted according to the tenant partitioning scheme. Tenant partitioning schemes can be made node independent, to allow tenant keys to migrate from one hypervisor to another on a different computing node, or potentially in different edge locations, as the different edge locations or nodes are connected with a secure channel.

It should be understood that, in some settings, a microservice/sidecar pair that is on one side of a service mesh may be described as local, while a microservice/sidecar on the other side of a service mesh may be described as remote. As a result, there can be multiple microservice/sidecar interactions that are local but may involve different tenants (or a single tenant). Similarly, there can be multiple microservice/side-car interactions that are remote but may involve different tenants (or a single tenant).

A microservice controller/orchestrator may manage microservice-to-microservice according to a single or multi-tenant interaction model. A Software Defined Network (SDN) may be used to define a service mesh such that the interactions (either single tenant or multi-tenant) may be software defined. Hardware RoTs may nevertheless be used to attest or demonstrate the hardware underpinning of an SDN/SDM (software defined mesh) and microservice or side-cars connected to the SDN/SDM configurations.

Figure 8:
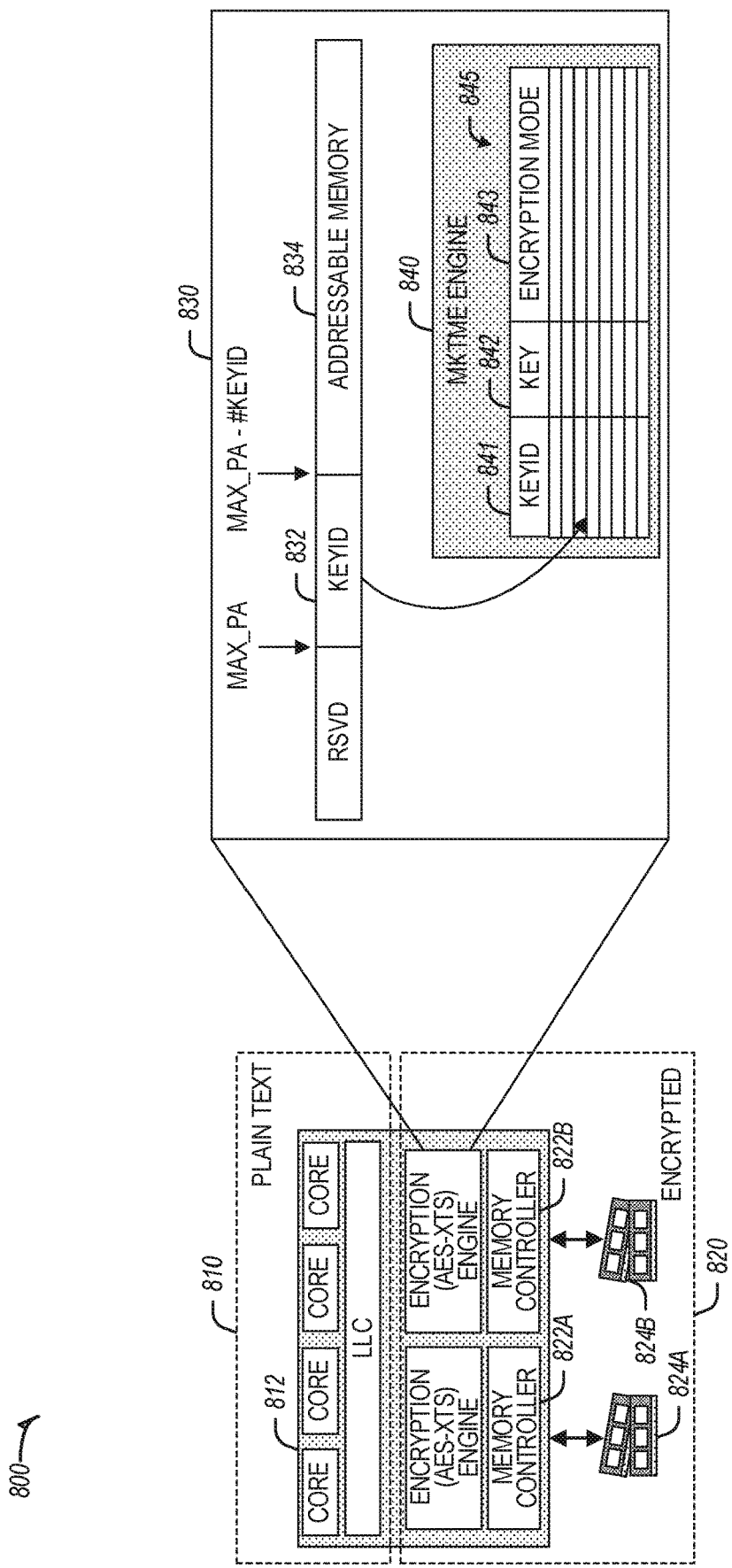
FIG. 8 illustrates a block diagram of a Multi-Key Total Memory Encryption (MKTME) architecture for encrypting data in memory, according to an example.

FIG. 8 illustrates a block diagram of a Multi-Key Total Memory Encryption (MKTME) architecture 800 for encrypting memory. Specifically, this architecture 800 illustrates how a computing system with multiple MKTME controllers (e.g., the instance of MKTME engine 840 implemented at one of multiple encryption engines) may be paired with multiple memory controllers 822A, 822B as the front end to memory subsystems 824A, 824B. The memory subsystems 824A, 824B may be provided from DRAM, FLASH, Intel® 3D-Xpoint, or any number of other memory/storage technologies (e.g., as discussed with reference to FIG. 6B, above). The operation of the MKTME architecture operates to establish an encrypted memory space 820 of a processing platform 812 for storage and access in the memory subsystems 824A, 824B, while enabling an unencrypted memory space 810 in the processing platform 812.

A MKTME controller 840 decodes memory access instructions (within operation of an engine 830) containing a KeyID value 832 that indexes into a key table 845 (e.g., a table indexed by a corresponding a KeyID value 841). This key table 845 contains the encryption key 842 and data for other modes 843 appropriate for applying encryption or decryption operations to addressable memory 834. Key management functions suitable to EaaS workloads and service mesh interactions cooperate with the MKTME controller 840 to update entries in the key table 845.

In an example, each sidecar VM (e.g., sidecars 731 and the like) is adapted to include key management functionality to perform the appropriate key migration steps, when key migration is needed to provide (e.g., share, transfer, send, etc.) data to other microservice instances (e.g., from the microservice 730 to the microservice 732, 734, etc.). Key migration may also involve transfer from a first cluster or group to a second cluster or group (e.g., to transfer data from the microservice 720 to the microservice 730). Key migration also may involve use of the hypervisor keys to endorse the migration.

Figure 9:
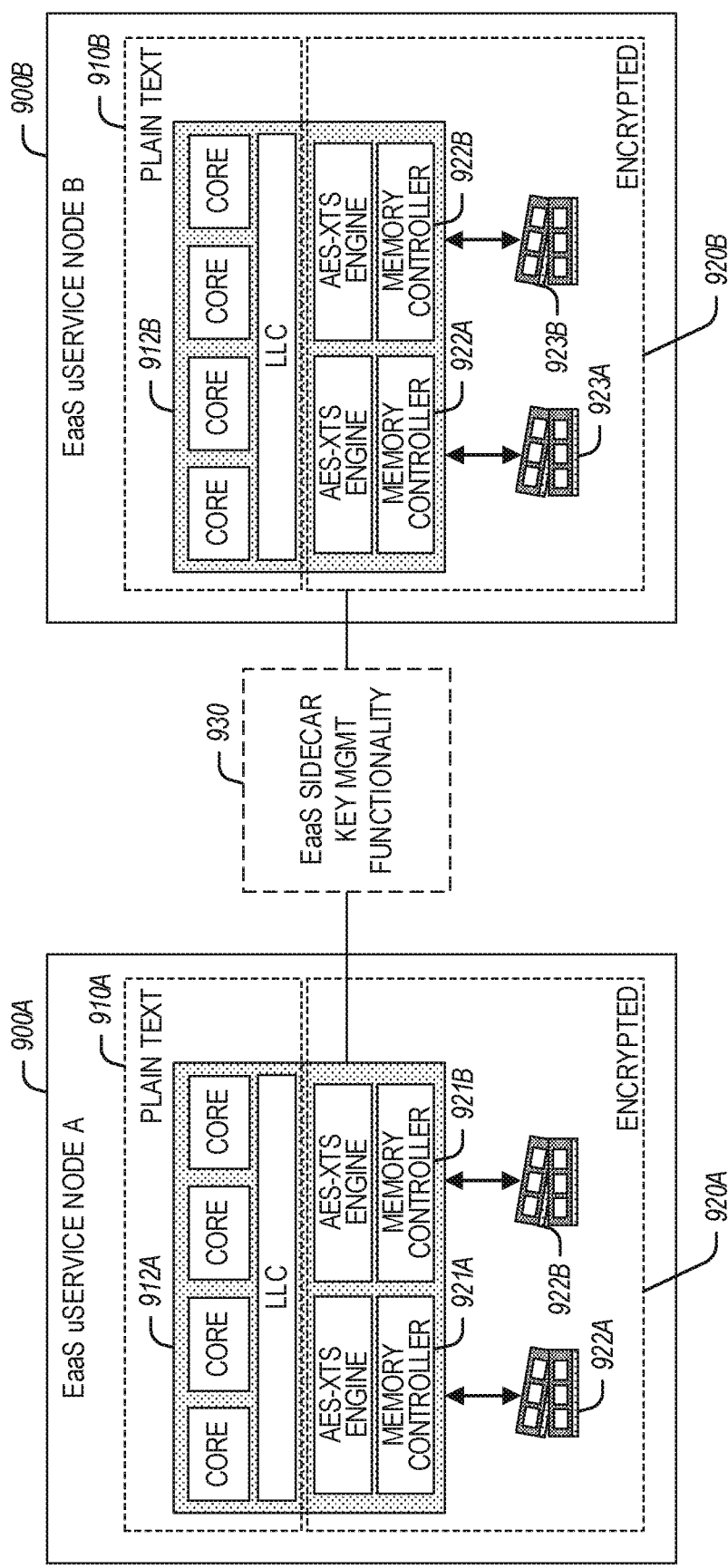
FIG. 9 illustrates a block diagram of edge computing nodes, utilizing a sidecar for key management functions for distributed interactions, according to an example.

FIG. 9 illustrates a block diagram of edge computing nodes, utilizing a sidecar 930 with key management functions for distributed interactions among edge computing nodes 900A and 900B. Specifically, FIG. 9 shows EaaS sidecar environments tied to MKTME controllers (respectively for Node A 900A and Node B 900B) where an EaaS mesh service or other EaaS distributed computing technique utilizes a key management protocol and algorithm for negotiating keys used to authenticate, integrity protect, or confidentially protect peer node interactions. Further, these keys may be used with MKTME controllers to retain these protections while data is located in memory accessible via MKTME front-ended memory controllers.

In a similar fashion as provided in FIG. 8, each node 900A, 900B includes computing hardware 912A, 912B having an area of operation for unencrypted data 910A, 910B and for encrypted data 920A, 920B. The encrypted data is managed at the respective storage devices 922A, 922B and 923A, 923B at each node with memory controllers 921A, 921B and 922A, 922B. The sidecar 930 includes key management functionality to share the appropriate memory encryption key between nodes 900A and 900B, so that encrypted data can be accessed and shared from node to node without needing to convert to another encryption key.

With the use of the key management functionality, distributed data operations can be enabled in hardware among multiple nodes, tenants, and other entities of a distributed computing system. In a scenario where two entities share an address space, the sidecar supports a dynamic keying mechanism that generates the correct set keys for the logical intersection of entities who are trying to share data. As a result, access to a shared memory region can be supported, through use of a key that is held by both principals, even while data remains encrypted.

Figure 10:
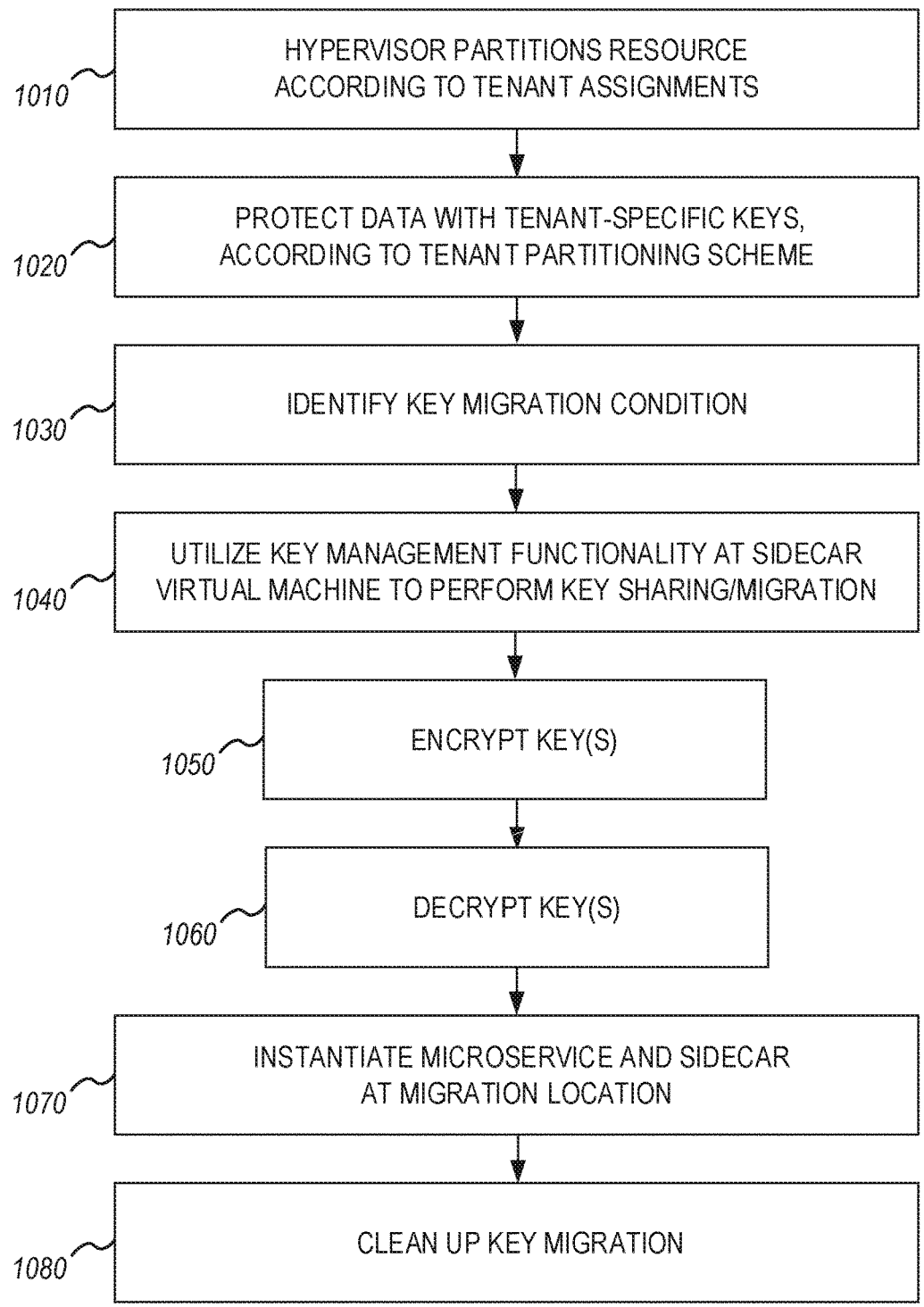
FIG. 10 illustrates a flowchart of a process for key migration among tenant nodes within an edge computing system performing memory encryption operations, according to an example.

FIG. 10 illustrates a flowchart 1000 of a process for key migration among tenant nodes within an edge computing system using memory encryption operations. This process may be implemented as a result of a variety of data transfer, exchange, sharing, or offloading scenarios, as microservices transfer protected data from one location to another. This process may also be implemented by coordination among the various sidecar VMs, or as part of coordination with a service mesh or other orchestration/management entities, as suggested with reference to the deployments in FIGS. 7 to 9, discussed above.

The flowchart 1000 begins with a hypervisor partitioning one or more resources, according to tenant assignments (operation 1010). Other partitioning on the basis of service types, groups, or other memberships, may also be implemented. Based on this partitioning, memory encryption techniques are used to protect data with tenant-specific keys (operation 1020), according to the tenant partitioning scheme (or the other applicable partitioning scheme).

The flowchart 1000 continues with operations to identify a key migration condition (operation 1030), such as from the transfer of data from one microservice to another or the sharing of data among two or more microservices; and the use of key management functionality at a sidecar virtual machine to perform the key sharing or migration (operation 1040). The communication of the key may include encryption of one or more keys (operation 1050) at applicable data sources and decryption of one or more keys (operation 1060) at applicable data destinations. In an example, consider a case where a peer node may have a trust anchor for KeyID 1 of the current node. In this example, a key wrapping function may be used with KeyID 1 to encrypt an EaaS microservice and sidecar key (memory encryption key) set to the peer node's hypervisor. Additionally, the KeyID may be determined by using a DICE architecture-generated key that is qualified by a hardware RoT and DICE layering. Such a qualification may involve use of a certificate path corresponding to the layering such that KeyID values are unambiguous and non-overlapping (e.g., in terms of namespaces).

The flowchart 1000 continues with operations to instantiate the microservice and sidecar at the migration location, and utilize the protected memory data based on the migrated keys (operation 1070). For example, the peer node hypervisor may decrypt (unwrap) the key set and instantiate the microservice and sidecar on the peer node to use the secured data. This may be followed by operations to clean up key migration (operation 1080). For example, the current node hypervisor may agree to remove the current microservice key context from being available for migration. However, in some examples, it may be appropriate to retain duplicate instances of a microservice context in order to implement redundancy, resiliency and high-availability solutions.

In a cases where persistent encrypted data is buffered/cached for use in encrypted memory (e.g., in MKTME-capable memory), the persistent storage keys may be supplied to the memory controller/cache controller. This enables the particular controller to decrypt when needed, avoiding unnecessary decryption/re-encryption to transition data from long-term storage to short-term cached or in-memory use. This complements the sidecar/microservice (main car) use case.

Protection of the microservice and connected service mesh environments (and keys) may be achieved in part by using separation and partitioning of compute resources, such as provided by virtualization. This protection may be augmented with specially hardened execution environment technology such as a trusted execution environment (e.g., provided by Intel SGX, or ARM TrustZone), a FPGA, security/crypto offload hardware, and the like.

One possible security concern with a particular implementation of memory encryption (e.g., MKTME) is that even if all data values in memory are encrypted with this encryption, there may be risks from vulnerabilities with the particular algorithm or implementation of encryption. The use of sidecars may mitigate such vulnerabilities, as sidecars may include software that can be adapted and updated to counteract known vulnerabilities. Further, the architectural consideration of separating EaaS security management features employed in a sidecar environment from the local processing features employed in a microservice environment enables further security separation from the underlying service instance.

As discussed herein, a key generated according to a Device Identity Composition Engine (DICE) specification key may be used as a MKTME key. In further examples, if the storage controller, hypervisor or para-virtualized guest VM implements a DICE approach to key generation, the controller environment may supply seed values in the form of a Compound Device Identifier (CDI) that may be used to derive or generate the full spectrum of microservice and sidecar keys. Further detail on the DICE architecture specification and the use of a CDI within such architectures is detailed by Trusted Computing Group (TCG) DICE specifications. The use of seeds is illustrated in more detail in the following examples.

Also, in further examples, the memory encryption techniques may also be provided based on implementation with hardware-based instructions, such as provided by Intel® Software Guard Extensions (SGX). For instance, an evolution of SGX may provide support for tenant-specific keys, or provide support for a tenant-specific loadable application to contain tenant-specific keys. Other forms or combinations of memory encryption and key management may also be adapted with the present techniques, including the use of DICE as a RoT where a layering of firmware in a secure execution environment provides for use of tenant-specific keys.

Figure 11:
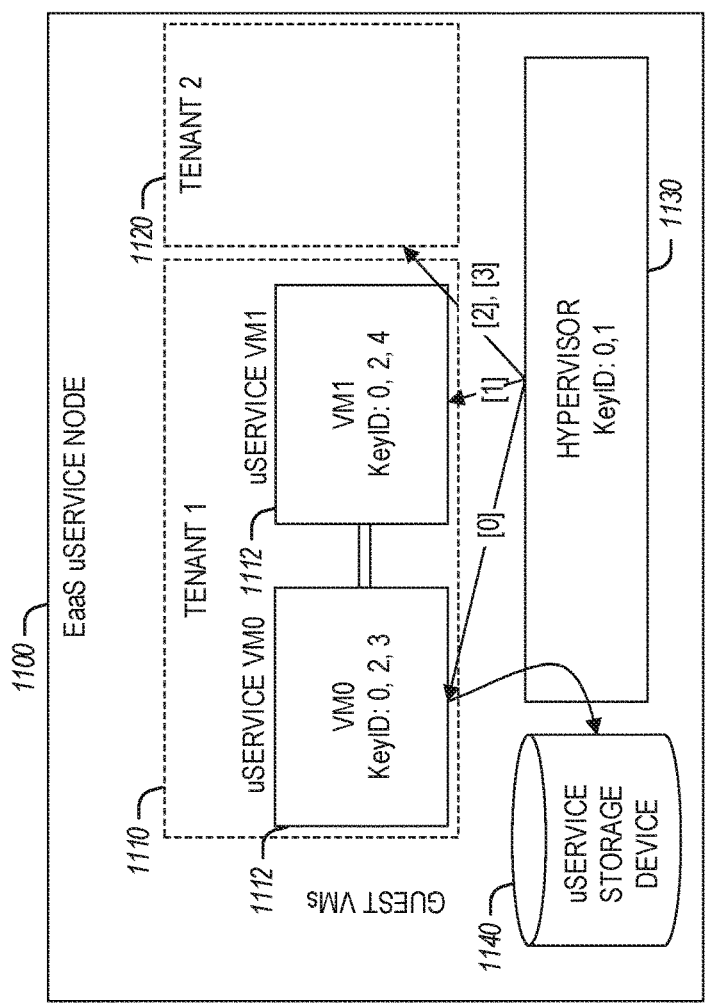
FIG. 11 illustrates a block diagram of an edge computing node operating a microservice and a sidecar with managed memory, according to an example.

FIG. 11 illustrates a block diagram of an edge computing node operating a microservice and a sidecar with managed memory. Specifically, this diagram illustrates an EaaS microservice computing node 1100 that provides multiple tenant environments 1110, 1120, with each environment including an EaaS micro-service and sidecar environment (e.g., as provided by microservice VM0 1111 and microservice VM1 1112, with sidecars not shown).

A possible implementation strategy involves using a hypervisor 1130 and the multiple VMs (e.g., VMs 1111, 1112 in tenant instance 1110) to implement microservice and sidecar environments, as well as to apply tenant isolation semantics, for access to the secured memory (e.g., data in microservice storage device 1140). Alternative implementation options might rely on data or operations provided within secure enclaves or trusted execution environments (e.g., established from Intel® SGX or ARM® TrustZone), trusted domains, physical resource partitioning, or other isolation or security techniques, to manage access and enforce security of the encrypted data in the storage device 1140.

In further examples, other entities besides a hypervisor, and other hypervisor configurations, may be used for implementation. For example, a sidecar may be implemented in some settings using a NIC, FPGA, or other accelerator (e.g., where the accelerator is a general purpose compute engine in addition to performing acceleration functions). In further examples, the hypervisor may be outside the trust boundary of the microservice and sidecar but may support binding the two entities. For instance, there may be a local secure path between the microservice and sidecar based on local cryptographic keys (e.g., established with a DICE architecture) where the microservice is provisioned with a policy that allows it to attest and trust the sidecar. The side-car also may be provisioned with a policy that allows it to attest and trust the microservice. Also, it will be understood that the microservice and sidecar may be bound or securely associated in other ways, whether using a hypervisor, microcode, or other features to establish a trusted binding/path between the microservice and sidecar.

Figure 12:
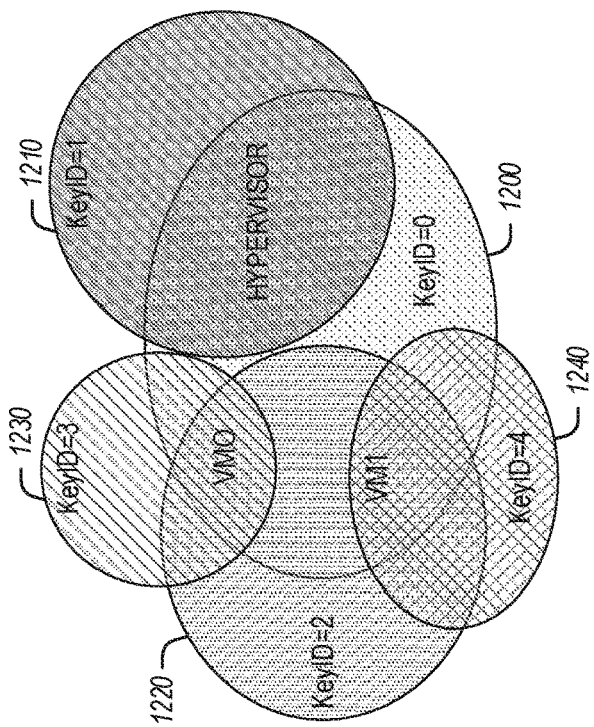
FIG. 12 illustrates an interoperability diagram, depicting overlap among encryption keys for managing memory, according to an example.

FIG. 12 illustrates an interoperability diagram, depicting overlap among encryption keys for managing and sharing memory, based on the key identifiers detailed in the VMs and hypervisor of computing node 1000. Specifically, this interoperability diagram illustrates the relationship between keys assigned for respective VMs. In an example, each tenant sub-environment (e.g. microservice or sidecar VMs, hypervisor) may allocate keys (e.g., keys within mappings 1200, 1210, 1220, 1230, 1240) according to an isolation policy. This isolation policy may allow data to be confidential to a specific environment (e.g., that VM) or shared across specific environments (e.g., multiple VMs) as depicted by the Venn diagram in FIG. 12. (This Venn diagram is simplified for purposes of illustration, and does not include many versions of keys). For instance, an EaaS service mesh may require multiple key pairings that allow peer-to-peer secure and authenticated interactions to accomplish service operations among multiple microservices. As another example, this policy may also allow a group key to be shared among all peers in the service mesh as well as other keys (e.g., group EPIDs) that do not require sharing of private keying material but still supports group interactions.

As shown in FIG. 11, each of the environments (e.g. microservices, sidecars, hypervisors) may implement key hierarchies using seed values that allow for localized key generation or derivation. Such linking may be provided by DICE layering, for instance, where the CDI (secret) from a previous layer of firmware or hardware is computed by cryptographically combining it with a digest of the next layer firmware, such that the next layer CDI value identifies the next layer and is cryptographically linked to the previous layer, and so on.

Accordingly, such key hierarchies may follow industry specifications for attestable device identities such as TCG Device Identity Composition Engine (DICE) technology where each environment is able to generate attestable identities using a Component Device Identity (CDI) value as the seed and where an attestation verification process may verify the software, firmware and other "state" associated with these environments as a condition of further mesh interactions. Further, inter-machine collaboration may be established, so that keys used to protect a particular shared storage area or buffer, are encrypted on one area and decrypted on another, with the same key.

A new instruction set architecture may facilitate dynamic arrangement of proxies such that each proxy has communication with its own domain "owner". However, lateral domain arrangement and communication involving other proxies may require specially negotiated key contexts such that different domains may agree to use different MKTME keys (e.g., KeyID 4 used in FIGS. 11 and 12).

Other variations for groups or a service mesh may also be provided. In a service configuration involving connections to multiple domain contexts (for example via a gateway node, such as depicted in FIG. 7) the gateway may apply domain specific policies associated with application semantics that might copy data from one domain to the other. For example, if Domain A had a policy that labeled data in Domain A as SENSITIVE while a policy for Domain B labeled it UNCLASSIFIED, the gateway might prevent nodes in Domain C authorized for only SENSITIVE from discovering Domain B. Furthermore, the gateway may authorize different keys for use with UNCLASSIFIED data than for SENSITIVE data. Cross-domain interactions might involve use of keys that are authorized by a domain controller. Such semantics may also have temporal connotations or properties, such as to support a timestamp where particular semantics change to support data evolving semantics (e.g., at time T3, change from SENSITIVE to UNCLASSIFIED). The use of key management by sidecars may enable domain controller authorized keys to be used with MKTME or other similar technologies for isolating and encrypting resources.

Another dimension of secure key management allows both encrypted and decrypted cached content to be shared across service mesh nodes that are participating in the same mesh, cluster, domain, distributed application, or group. The memory encryption controller may be augmented with caching capabilities such that data shared across mesh nodes can reside in distributed mesh caches and may contain state variables related to activities of peer nodes in the mesh. When a microservice runs, the cache can be utilized to quickly load the appropriate mesh context. Also, if appropriate, cached content can be decrypted for use in a local application context or re-encrypted using an appropriate local application or microservice context.

Additionally, every EaaS microservice/mesh application is often implemented without knowing who (or what) it will be interacting with it ahead of time; this service or application may know at a logical level who it will interact with, but peer nodes might have a context on a local node or some other mesh node. Connections between the current node and the memory encryption controller can rely on the sidecar to make the appropriate context switch. This context switch may be assisted by "helper" functions that use "liabilities" policies to determine when a context switch is appropriate and which key operations are most appropriate. This approach means that the underlying encryption strategy (such as MKTME) can be used without needing to translate data, to avoid unnecessary decrypt/re-encrypt operations. This makes the sidecars more efficient. Other variations to key management and distribution may be provided, such as with use of a key distribution service, certificate authority, or another entity who can specify the use of keys in particular contexts.

Figure 13:
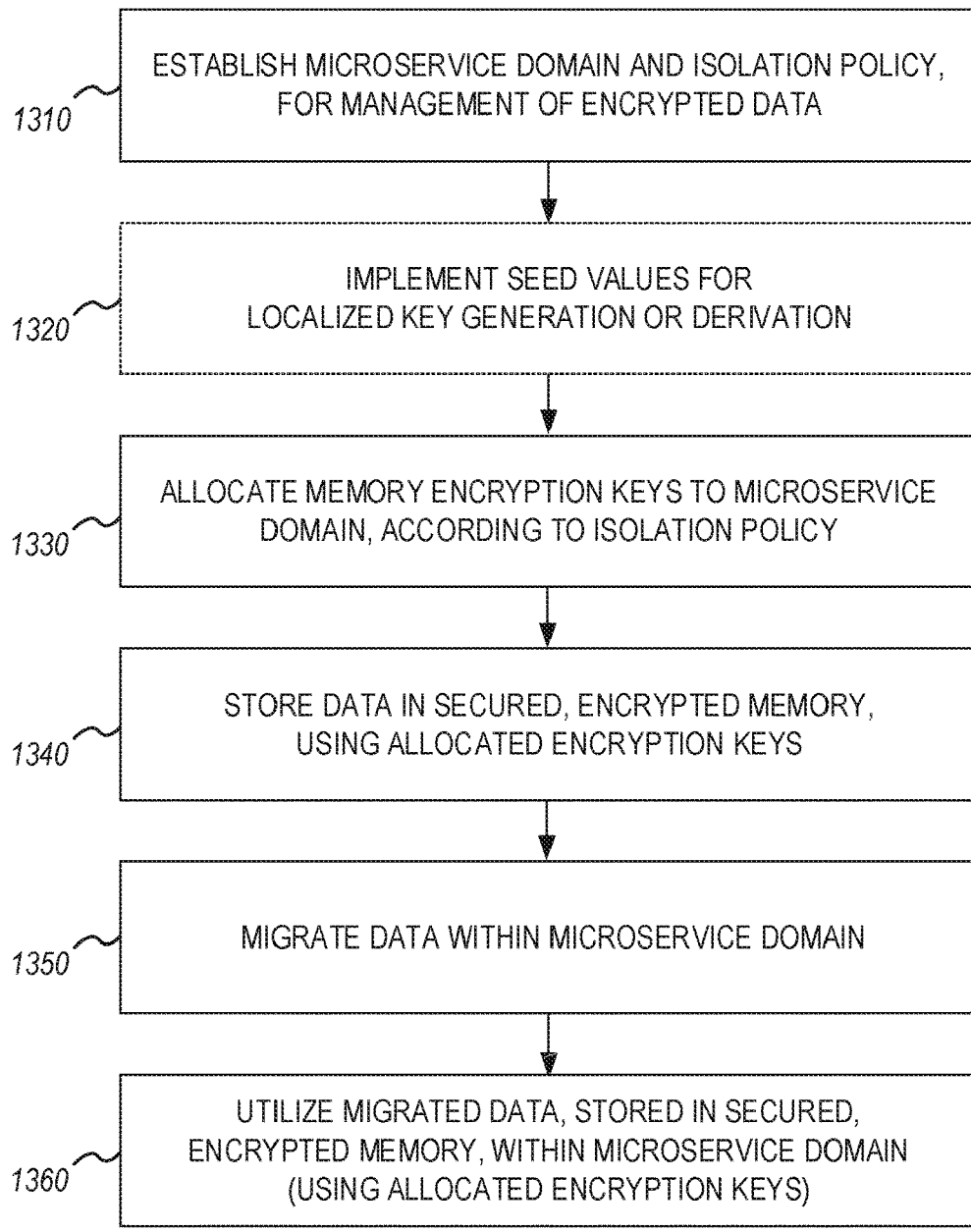
FIG. 13 illustrates a flowchart of an example process for facilitating communications among edge computing nodes using memory encryption operations, according to an example.

FIG. 13 illustrates a flowchart 1300 of an example process for facilitating communications among edge computing nodes using memory encryption, according to an example. The following flowchart 1300 is illustrated from the perspective of an edge computing system which includes multiple edge computing instances (e.g., edge computing nodes) deployed among respective virtual machines, including the use of a hypervisor(s) and virtual machines for the deployment of microservice instances and accompanying proxy sidecars. However, in an example, the operations may be coordinated among: a larger, distributed computing system or platform; within a service mesh; or within a variety of other configurations deployed among a microservice deployment domain.

The flowchart 1300 begins with operation 1310, performed by the edge computing system, to establish a microservice domain and isolation policy, for management of encrypted data. In various examples, a microservice domain encompasses (includes a definition for) a plurality of microservices, as the plurality of microservices utilize respective keys of the allocated memory encryption keys for encryption of respective sets of data within the memory of the edge computing system. This isolation policy may provide definition of confidentiality or sharing among various entities of the domain (such as microservice, sidecar, and hypervisor entities). For instance, the microservice domain may be configured to enable data sharing between a first tenant and a second tenant of a system; an implementing policy in this domain may enable sharing among a first and second microservice, with the first microservice being associated with and secured to a first tenant, and the second microservice being associated with and secured to a second tenant.

The flowchart 1300 continues with optional operation 1320, to implement seed values for localized key generation or derivation. For example, a seed that is unique to a microservice, to a sidecar of the microservice, or to a tenant of the microservice, may be used to derive respective keys of the allocated memory encryption keys. For instance, the seed may be produced from a compound device identifier (CDI) generated according to a Device Identity Composition Engine (DICE) specification.

The flowchart 1300 continues with operation 1330, to allocate memory encryption keys to a microservice domain, according to the isolation policy. In one configuration the data isolation policy is provided based on tenant assignments determined by a hypervisor, as the plurality of microservices and the sidecars are operated in respective virtual machines managed by the hypervisor. For instance, the microservice domain may be defined to include a first virtual machine for the first microservice, a second virtual machine for the second microservice, and the hypervisor. Additionally, in an example, the microservice, sidecar, and hypervisor entities associated with each tenant are allocated with respective memory encryption keys according to the data isolation policy, as the respective memory encryption keys are established (or utilized) in the data isolation policy.

The flowchart 1300 continues with operation 1340, to store data in secured, encrypted memory, using the allocated encryption keys. For instance, encryption of respective sets of data within the memory may be provided from multi-key memory encryption techniques, as at least one of the respective keys of the allocated memory encryption keys corresponds to a respective tenant in the edge computing system.

The flowchart 1300 continues with operation 1350, to migrate data within the microservice domain. Additional processing (not shown) may occur to begin or proceed with the migration process (such as with processing of a request to migrate the data). For instance, operations may occur to identify a migration condition, that causes or initiates the transfer the encrypted data, and the communication of the encryption key to enable migration of the encrypted data from the first microservice to the second microservice.

The migration itself may include sharing data associated with a first microservice of the microservice domain, to be shared with a second microservice of the microservice domain, using operations that communicate an encryption key (while, optionally, maintaining the encrypted data in the memory). The communication of the encryption key, used for the encrypted data stored in the memory, enables communication from a proxy associated with the first microservice to a proxy associated with the second microservice. The maintenance of the encrypted data within the memory enables the access and use of encrypted data already stored in the memory with the communicated encryption key.

In specific examples, the proxy associated with the first microservice and the proxy associated with the second microservice are respective sidecars (e.g., operating in an arrangement of a plurality of sidecars). For example, the respective sidecars may correspond to respective microservices of the plurality of microservices. In this configuration, the respective sidecars associated with the first microservice and the second microservice each include key management functionality, and use the key management functionality to manage interactions for securely exchanging data between the first microservice and the second microservice (as in operation 1360).

The flowchart 1300 continues with operation 1360, to utilize migrated data, stored in the secured, encrypted memory, within other entities of the microservice domain (using the allocated encryption keys). In further examples, the microservice domain is defined among entities of a service mesh within a computing system, as the first microservice operates as a member of a first cluster orchestrated by a first gateway, and as the second microservice operates as a member of a second cluster orchestrated by a second gateway. Likewise, in a specific configuration, the first microservice operates on a first node of the edge computing system, with the first node including a first hypervisor, as the second microservice operates on a second node of the edge computing system, with the second node including a second hypervisor. In this configuration, the first microservice and the second microservice may be connected via a service mesh, as respective key pairings are established within the service mesh to enable peer-to-peer secure and authenticated interactions among respective entities of the edge computing system.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

ADDITIONAL NOTES & EXAMPLES

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 is an edge computing system, comprising: memory configured to store encrypted data; and processing circuitry configured to perform operations that: allocate memory encryption keys according to a data isolation policy defined for a microservice domain, the microservice domain including a plurality of microservices, wherein the plurality of microservices utilize respective keys of the allocated memory encryption keys for encryption of respective sets of data within the memory, and share data associated with a first microservice of the microservice domain to a second microservice of the microservice domain, with operations that: communicate an encryption key, used on the encrypted data stored in the memory, from a proxy associated with the first microservice to a proxy associated with the second microservice; and maintain the encrypted data within the memory, wherein the second microservice is enabled to use the encrypted data stored in the memory with the communicated encryption key.

In Example 2, the subject matter of Example 1 includes, subject matter where the proxy associated with the first microservice and the proxy associated with the second microservice are respective sidecars from a plurality of sidecars, wherein the respective sidecars of the plurality of sidecars correspond to respective microservices of the plurality of microservices.

In Example 3, the subject matter of Example 2 includes, subject matter where the respective sidecars associated with the first microservice and the second microservice each include key management functionality, the key management functionality to manage interactions for securely exchanging data between the first microservice and the second microservice.

In Example 4, the subject matter of Examples 2-3 includes, subject matter where the data isolation policy is provided based on tenant assignments determined by a hypervisor, wherein the plurality of microservices and the sidecars are operated in respective virtual machines managed by the hypervisor.

In Example 5, the subject matter of Example 4 includes, subject matter where the microservice domain includes a first virtual machine for the first microservice, a second virtual machine for the second microservice, and the hypervisor.

In Example 6, the subject matter of Examples 4-5 includes, subject matter where microservice, sidecar, and hypervisor entities associated with each tenant are allocated with respective memory encryption keys according to the data isolation policy, and wherein the respective memory encryption keys are established in the data isolation policy based on a definition of confidentiality or sharing among the microservice, sidecar, and hypervisor entities.

In Example 7, the subject matter of Examples 1-6 includes, subject matter where the first microservice is associated with a first tenant, wherein the second microservice is associated with a second tenant, and wherein the microservice domain enables data sharing between the first tenant and the second tenant.

In Example 8, the subject matter of Example 7 includes, subject matter where the encryption of respective sets of data within the memory is provided from multi-key memory encryption, wherein at least one of the respective keys of the allocated memory encryption keys corresponds to a respective tenant in the edge computing system.

In Example 9, the subject matter of Examples 1-8 includes, the processing circuitry further configured to: identify a migration condition, which causes or initiates the transfer the encrypted data and communication of the encryption key to enable migration of the encrypted data from the first microservice to the second microservice.

In Example 10, the subject matter of Examples 1-9 includes, subject matter where the microservice domain is defined among entities of a service mesh within a computing system, wherein the first microservice is a member of a first cluster orchestrated by a first gateway, and wherein the second microservice is a member of a second cluster orchestrated by a second gateway.

In Example 11, the subject matter of Examples 1-10 includes, subject matter where a seed that is unique to a microservice, to a sidecar of the microservice, or to a tenant of the microservice, is used to derive respective keys of the allocated memory encryption keys.

In Example 12, the subject matter of Example 11 includes, subject matter where the seed comprises a compound device identifier (CDI) generated according to a Device Identity Composition Engine (DICE) specification.

In Example 13, the subject matter of Examples 1-12 includes, subject matter where the operations that communicate the encryption key from the proxy associated with the first microservice to the proxy associated with the second microservice, include: encrypting the encryption key; and providing the encryption key to a hypervisor, the hypervisor having instantiated the first microservice and the proxy associated with the first microservice; wherein the hypervisor decrypts the encryption key, instantiates the second microservice and the proxy associated with the second microservice, and provides the encryption key to the proxy associated with the second microservice for use by the second microservice.

In Example 14, the subject matter of Examples 1-13 includes, subject matter where the first microservice operates on a first node of the edge computing system, the first node including a first hypervisor, wherein the second microservice operates on a second node of the edge computing system, the second node including a second hypervisor.

In Example 15, the subject matter of Example 14 includes, subject matter where the first microservice and the second microservice are connected via a service mesh, and wherein respective key pairings are established within the service mesh to enable peer-to-peer secure and authenticated interactions among respective entities of the edge computing system.

Example 16 is a method performed by an edge computing system, comprising: allocating memory encryption keys according to a data isolation policy defined for a microservice domain, the microservice domain including a plurality of microservices, wherein the plurality of microservices utilize respective keys of the allocated memory encryption keys for encryption of respective sets of data within a memory of the edge computing system; and sharing data associated with a first microservice of the microservice domain to a second microservice of the microservice domain, with operations that: communicating an encryption key, used on the encrypted data stored in the memory, from a proxy associated with the first microservice to a proxy associated with the second microservice; and maintaining the encrypted data within the memory, wherein the second microservice is enabled to use the encrypted data stored in the memory with the communicated encryption key.

In Example 17, the subject matter of Example 16 includes, subject matter where the proxy associated with the first microservice and the proxy associated with the second microservice are respective sidecars from a plurality of sidecars, wherein the respective sidecars of the plurality of sidecars correspond to respective microservices of the plurality of microservices.

In Example 18, the subject matter of Example 17 includes, subject matter where the respective sidecars associated with the first microservice and the second microservice each include key management functionality, the key management functionality to manage interactions for securely exchanging data between the first microservice and the second microservice.

In Example 19, the subject matter of Examples 17-18 includes, subject matter where the data isolation policy is provided based on tenant assignments determined by a hypervisor, wherein the plurality of microservices and the sidecars are operated in respective virtual machines managed by the hypervisor.

In Example 20, the subject matter of Example 19 includes, subject matter where the microservice domain includes a first virtual machine for the first microservice, a second virtual machine for the second microservice, and the hypervisor.

In Example 21, the subject matter of Examples 19-20 includes, subject matter where microservice, sidecar, and hypervisor entities associated with each tenant are allocated with respective memory encryption keys according to the data isolation policy, and wherein the respective memory encryption keys are established in the data isolation policy based on a definition of confidentiality or sharing among the microservice, sidecar, and hypervisor entities.

In Example 22, the subject matter of Examples 16-21 includes, subject matter where the first microservice is associated with a first tenant, wherein the second microservice is associated with a second tenant, and wherein the microservice domain enables data sharing between the first tenant and the second tenant.

In Example 23, the subject matter of Example 22 includes, subject matter where the encryption of respective sets of data within the memory is provided from multi-key memory encryption, wherein at least one of the respective keys of the allocated memory encryption keys corresponds to a respective tenant in the edge computing system.

In Example 24, the subject matter of Examples 16-23 includes, the method further comprising: identifying a migration condition, which causes or initiates the transfer the encrypted data and communication of the encryption key to enable migration of the encrypted data from the first microservice to the second microservice.

In Example 25, the subject matter of Examples 16-24 includes, subject matter where the microservice domain is defined among entities of a service mesh within a computing system, wherein the first microservice is a member of a first cluster orchestrated by a first gateway, and wherein the second microservice is a member of a second cluster orchestrated by a second gateway.

In Example 26, the subject matter of Examples 16-25 includes, subject matter where a seed that is unique to a microservice, to a sidecar of the microservice, or to a tenant of the microservice, is used to derive respective keys of the allocated memory encryption keys.

In Example 27, the subject matter of Example 26 includes, subject matter where the seed comprises a compound device identifier (CDI) generated according to a Device Identity Composition Engine (DICE) specification.

In Example 28, the subject matter of Examples 16-27 includes, subject matter where the operations that communicate the encryption key, from the proxy associated with the first microservice to the proxy associated with the second microservice, include: encrypting the encryption key; and providing the encryption key to a hypervisor, the hypervisor having instantiated the first microservice and the proxy associated with the first microservice; wherein the hypervisor decrypts the encryption key, instantiates the second microservice and the proxy associated with the second microservice, and provides the encryption key to the proxy associated with the second microservice for use by the second microservice.

In Example 29, the subject matter of Examples 16-28 includes, subject matter where the first microservice operates on a first node of the edge computing system, the first node including a first hypervisor, wherein the second microservice operates on a second node of the edge computing system, the second node including a second hypervisor.

In Example 30, the subject matter of Example 29 includes, subject matter where the first microservice and the second microservice are connected via a service mesh, and wherein respective key pairings are established within the service mesh to enable peer-to-peer secure and authenticated interactions among respective entities of the edge computing system.

Example 31 is at least one non-transitory machine-readable storage medium comprising instructions or stored data which may be configured into instructions, wherein the instructions, when configured and executed by processing circuitry of a computing device, cause the processing circuitry to perform any of the operations of Examples 16 to 30.

Example 32 is an apparatus, operable in an edge computing system, the apparatus comprising: means for allocating memory encryption keys according to a data isolation policy defined for a microservice domain, the microservice domain including a plurality of microservices, wherein the plurality of microservices utilize respective keys of the allocated memory encryption keys for encryption of respective sets of data within a memory of the edge computing system; and means for sharing data associated with a first microservice of the microservice domain to a second microservice of the microservice domain; means for communicating an encryption key, used on the encrypted data stored in the memory, from a proxy associated with the first microservice to a proxy associated with the second microservice; and means for maintaining the encrypted data within the memory, wherein the second microservice is enabled to use the encrypted data stored in the memory with the communicated encryption key.

In Example 33, the subject matter of Example 32 includes, means for operating a plurality of sidecars, wherein the proxy associated with the first microservice and the proxy associated with the second microservice are respective sidecars of the plurality of sidecars, and wherein the respective sidecars of the plurality of sidecars correspond to respective microservices of the plurality of microservices.

In Example 34, the subject matter of Example 33 includes, means for implementing key management functionality, wherein the respective sidecars associated with the first microservice and the second microservice each include the key management functionality, the key management functionality to manage interactions for securely exchanging data between the first microservice and the second microservice.

In Example 35, the subject matter of Examples 33-34 includes, means for implementing a hypervisor, wherein the data isolation policy is provided based on tenant assignments determined by the hypervisor, and wherein the plurality of microservices and the sidecars are operated in respective virtual machines managed by the hypervisor.

In Example 36, the subject matter of Example 35 includes, means for establishing a microservice domain, wherein the microservice domain includes a first virtual machine for the first microservice, a second virtual machine for the second microservice, and the hypervisor.

In Example 37, the subject matter of Examples 35-36 includes, means for allocating respective memory encryption keys, wherein microservice, sidecar, and hypervisor entities associated with each tenant are allocated with respective memory encryption keys according to the data isolation policy, and wherein the respective memory encryption keys are established in the data isolation policy based on a definition of confidentiality or sharing among the microservice, sidecar, and hypervisor entities.

In Example 38, the subject matter of Examples 32-37 includes, means for associating the first microservice with a first tenant; means for associating the second microservice with a second tenant; and means for enabling data sharing between the first tenant and the second tenant with the microservice domain.

In Example 39, the subject matter of Example 38 includes, means for implementing the encryption of respective sets of data within the memory with multi-key memory encryption, wherein at least one of the respective keys of the allocated memory encryption keys corresponds to a respective tenant in the edge computing system.

In Example 40, the subject matter of Examples 32-39 includes, means for identifying a migration condition, which causes or initiates the transfer the encrypted data and communication of the encryption key to enable migration of the encrypted data from the first microservice to the second microservice.

In Example 41, the subject matter of Examples 32-40 includes, means for defining the microservice domain among entities of a service mesh within a computing system, wherein the first microservice is a member of a first cluster orchestrated by a first gateway, and wherein the second microservice is a member of a second cluster orchestrated by a second gateway.

In Example 42, the subject matter of Examples 32-41 includes, means for deriving respective keys of the allocated memory encryption keys, using a seed that is unique to a microservice, to a sidecar of the microservice, or to a tenant of the microservice.

In Example 43, the subject matter of Example 42 includes, means for providing the seed using a compound device identifier (CDI) generated according to a Device Identity Composition Engine (DICE) specification.

In Example 44, the subject matter of Examples 32-43 includes, means for encrypting the encryption key; and means for providing the encryption key to a hypervisor, the hypervisor having instantiated the first microservice and the proxy associated with the first microservice; wherein the hypervisor decrypts the encryption key, instantiates the second microservice and the proxy associated with the second microservice, and provides the encryption key to the proxy associated with the second microservice for use by the second microservice.

In Example 45, the subject matter of Examples 32-44 includes, means for coordinating operation of the first microservice on a first node of the edge computing system, the first node including a first hypervisor; and means for coordinating operation of the second microservice on a second node of the edge computing system, the second node including a second hypervisor.

In Example 46, the subject matter of Example 45 includes, means for coordinating the first microservice and the second microservice to be connected via a service mesh, and wherein respective key pairings are established within the service mesh to enable peer-to-peer secure and authenticated interactions among respective entities of the edge computing system.

Example 47 is a memory controller, configured to perform one or more operations of a method described in or related to any of Examples 1-46, or any other method or process described herein.

Example 48 is a network interface card, configured to perform one or more operations of a method described in or related to any of Examples 1-46, or any other method or process described herein.

Example 49 is memory encryption circuitry, configured to perform one or more operations of a method described in or related to any of Examples 1-46, or any other method or process described herein.

Example 50 is a computing processing platform, configured to perform one or more operations of a method described in or related to any of Examples 1-46, or any other method or process described herein.

Example 51 is at least one machine-readable storage medium including instructions, wherein the instructions, when executed by a processing circuitry of a computing device, cause the processing circuitry to perform operations of any of Examples 1-46.

Example 52 may include one or more non-transitory computer-readable media comprising data to cause an electronic device, upon loading, execution, configuration, or provisioning of the instructions by one or more processors or electronic circuitry of the electronic device, to perform one or more elements of a method described in or related to any of Examples 1-46, or any other method or process described herein.

Example 53 may include an apparatus comprising logic, modules, or circuitry to perform one or more elements of a method described in or related to any of Examples 1-46, or any other method or process described herein.

Example 54 may include a method, technique, or process as described in or related to any of Examples 1-46, or portions or parts thereof.

Example 55 may include an apparatus comprising: one or more processors and one or more computer readable media comprising instructions that, when executed by the one or more processors, cause the one or more processors to perform the method, techniques, or process as described in or related to any of Examples 1-46, or portions thereof.

Example 56 may include a signal as described in or related to any of Examples 1-46, or portions or parts thereof.

Example 57 may include a signal in a network as described in or related to any of Examples 1-46, or as otherwise shown and described herein.

Example 58 may include a method of performing or coordinating communications among a network as described in or related to any of Examples 1-46, or as otherwise shown and described herein.

Example 59 may include a device for processing communication as described in or related to any of Examples 1-46, or as otherwise shown and described herein.

Example 60 is a network comprising respective devices and device communication mediums for performing any of the operations of Examples 1-46, or as otherwise shown and described herein.

Example 61 is an edge cloud computing device implementation comprising processing nodes and computing units adapted for performing any of the operations of Examples 1-46, or as otherwise shown and described herein.

Example 62 is an apparatus comprising means to implement of any of Examples 1-61.

Example 63 is a system to implement of any of Examples 1-62.

Example 64 is a method to implement of any of Examples 1-62.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An edge computing system, comprising:
memory configured to store encrypted data; and
processing circuitry configured to perform operations that:
allocate memory encryption keys according to a data isolation policy defined for a microservice domain, the microservice domain including a plurality of microservices, wherein the plurality of microservices utilize respective keys of the allocated memory encryption keys for encryption of respective sets of data within the memory; and
share data associated with a first microservice of the microservice domain to a second microservice of the microservice domain, with operations that:
communicate an encryption key, used on the encrypted data stored in the memory, from a proxy associated with the first microservice to a proxy associated with the second microservice; and
maintain the encrypted data within the memory, wherein the second microservice is enabled to use the encrypted data stored in the memory with the communicated encryption key.

2. The edge computing system of claim 1, wherein the proxy associated with the first microservice and the proxy associated with the second microservice are respective sidecars from a plurality of sidecars, wherein the respective sidecars of the plurality of sidecars correspond to respective microservices of the plurality of microservices.

3. The edge computing system of claim 2, wherein the respective sidecars associated with the first microservice and the second microservice each include key management functionality, the key management functionality to manage interactions for securely exchanging data between the first microservice and the second microservice.

4. The edge computing system of claim 2, wherein the data isolation policy is provided based on tenant assignments determined by a hypervisor, wherein the plurality of microservices and the sidecars are operated in respective virtual machines managed by the hypervisor.

5. The edge computing system of claim 4, wherein the microservice domain includes a first virtual machine for the first microservice, a second virtual machine for the second microservice, and the hypervisor.

6. The edge computing system of claim 4, wherein microservice, sidecar, and hypervisor entities associated with each tenant are allocated with respective memory encryption keys according to the data isolation policy, and wherein the respective memory encryption keys are established in the data isolation policy based on a definition of confidentiality or sharing among the microservice, sidecar, and hypervisor entities.

7. The edge computing system of claim 1, wherein the first microservice is associated with a first tenant, wherein the second microservice is associated with a second tenant, and wherein the microservice domain enables data sharing between the first tenant and the second tenant.

8. The edge computing system of claim 7, wherein the encryption of respective sets of data within the memory is provided from multi-key memory encryption, wherein at least one of the respective keys of the allocated memory encryption keys corresponds to a respective tenant in the edge computing system.

9. The edge computing system of claim 1, the processing circuitry further configured to:
identify a migration condition, which causes or initiates a transfer of the encrypted data and communication of the encryption key to enable migration of the encrypted data from the first microservice to the second microservice.

10. The edge computing system of claim 1, wherein the microservice domain is defined among entities of a service mesh within a computing system, wherein the first microservice is a member of a first cluster orchestrated by a first gateway, and wherein the second microservice is a member of a second cluster orchestrated by a second gateway.

11. The edge computing system of claim 1, wherein a seed that is unique to a microservice, to a sidecar of the microservice, or to a tenant of the microservice, is used to derive respective keys of the allocated memory encryption keys.

12. The edge computing system of claim 11, wherein the seed comprises a compound device identifier (CDI) generated according to a Device Identity Composition Engine (DICE) specification.

13. The edge computing system of claim 1, wherein the operations that communicate the encryption key from the proxy associated with the first microservice to the proxy associated with the second microservice, include:
encrypting the encryption key; and
providing the encryption key to a hypervisor, the hypervisor having instantiated the first microservice and the proxy associated with the first microservice;
wherein the hypervisor decrypts the encryption key, instantiates the second microservice and the proxy associated with the second microservice, and provides the encryption key to the proxy associated with the second microservice for use by the second microservice.

14. The edge computing system of claim 1, wherein the first microservice operates on a first node of the edge computing system, the first node including a first hypervisor, wherein the second microservice operates on a second node of the edge computing system, the second node including a second hypervisor.

15. The edge computing system of claim 14, wherein the first microservice and the second microservice are connected via a service mesh, and wherein respective key pairings are established within the service mesh to enable peer-to-peer secure and authenticated interactions among respective entities of the edge computing system.

16. A method performed by a computing device of an edge computing system, comprising:
allocating memory encryption keys according to a data isolation policy defined for a microservice domain, the microservice domain including a plurality of microservices, wherein the plurality of microservices utilize respective keys of the allocated memory encryption keys for encryption of respective sets of data within a memory of the edge computing system; and
sharing data associated with a first microservice of the microservice domain to a second microservice of the microservice domain, with operations to:
communicate an encryption key, used on the encrypted data stored in the memory, from a proxy associated with the first microservice to a proxy associated with the second microservice; and
maintain the encrypted data within the memory, wherein the second microservice is enabled to use the encrypted data stored in the memory with the communicated encryption key.

17. The method of claim 16, wherein the proxy associated with the first microservice and the proxy associated with the second microservice are respective sidecars from a plurality of sidecars, wherein the respective sidecars of the plurality of sidecars correspond to respective microservices of the plurality of micro services.

18. The method of claim 17, wherein the respective sidecars associated with the first microservice and the second microservice each include key management functionality, the key management functionality to manage interactions for securely exchanging data between the first microservice and the second microservice.

19. The method of claim 17, wherein the data isolation policy is provided based on tenant assignments determined by a hypervisor, wherein the plurality of microservices and the sidecars are operated in respective virtual machines managed by the hypervisor, wherein microservice, sidecar, and hypervisor entities associated with each tenant are allocated with respective memory encryption keys according to the data isolation policy, and wherein the respective memory encryption keys are established in the data isolation policy based on a definition of confidentiality or sharing among the microservice, sidecar, and hypervisor entities.

20. The method of claim 16, wherein the first microservice is associated with a first tenant, wherein the second microservice is associated with a second tenant, wherein the microservice domain enables data sharing between the first tenant and the second tenant, wherein the encryption of respective sets of data within the memory is provided from multi-key memory encryption, and wherein at least one of the respective keys of the allocated memory encryption keys corresponds to a respective tenant in the edge computing system.

21. The method of claim 16, wherein a seed that is unique to a microservice, to a sidecar of the microservice, or to a tenant of the microservice, is used to derive respective keys of the allocated memory encryption keys, wherein the seed comprises a compound device identifier (CDI) generated according to a Device Identity Composition Engine (DICE) specification.

22. At least one non-transitory machine-readable storage medium comprising instructions, wherein the instructions, when executed by a processing circuitry of a computing device, cause the processing circuitry to perform operations that:
allocate memory encryption keys according to a data isolation policy defined for a microservice domain, the microservice domain including a plurality of microservices, wherein the plurality of microservices utilize respective keys of the allocated memory encryption keys for encryption of respective sets of data within memory of the computing device; and share data associated with a first microservice of the microservice domain to a second microservice of the microservice domain, with operations that:
communicate an encryption key, used on the encrypted data stored in the memory, from a proxy associated with the first microservice to a proxy associated with the second microservice; and
maintain the encrypted data within the memory, wherein the second microservice is enabled to use the encrypted data stored in the memory with the communicated encryption key.

23. The machine-readable storage medium of claim 22, wherein the proxy associated with the first microservice and the proxy associated with the second microservice are respective sidecars from a plurality of sidecars, wherein the respective sidecars of the plurality of sidecars correspond to respective microservices of the plurality of microservices, and wherein the respective sidecars associated with the first microservice and the second microservice each include key management functionality, the key management functionality to manage interactions for securely exchanging data between the first microservice and the second microservice.

24. The machine-readable storage medium of claim 22, wherein the data isolation policy is provided based on tenant assignments determined by a hypervisor, wherein the plurality of microservices and a plurality of sidecars are operated in respective virtual machines managed by the hypervisor, wherein microservice, sidecar, and hypervisor entities associated with each tenant are allocated with respective memory encryption keys according to the data isolation policy, and wherein the respective memory encryption keys are established in the data isolation policy based on a definition of confidentiality or sharing among the microservice, sidecar, and hypervisor entities.

25. The machine-readable storage medium of claim 22, wherein the first microservice is associated with a first tenant, wherein the second microservice is associated with a second tenant, wherein the microservice domain enables data sharing between the first tenant and the second tenant, wherein the encryption of respective sets of data within the memory is provided from multi-key memory encryption, and wherein at least one of the respective keys of the allocated memory encryption keys corresponds to a respective tenant in the computing device.

* * * * *